(12) United States Patent
Fjelstad et al.

(10) Patent No.: US 12,717,354 B2
(45) Date of Patent: Aug. 25, 2026

(54) DYNAMIC GUIDANCE SYSTEM FOR ACCOMPANYING VEHICLE AND METHODS FOR SAME

(71) Applicant: Raven Industries, Inc., Sioux Falls, SD (US)

(72) Inventors: Stephen Filip Fjelstad, Worthing, SD (US); Jeffrey Allen Van Roekel, Sioux Falls, SD (US); Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 375 days.

(21) Appl. No.: 18/174,464

(22) Filed: Feb. 24, 2023

(65) Prior Publication Data

US 2023/0273614 A1 Aug. 31, 2023

Related U.S. Application Data

(60) Provisional application No. 63/314,220, filed on Feb. 25, 2022.

(51) Int. Cl.

*G05D 1/698* (2024.01)
*G05D 1/69* (2024.01)
*G05D 1/692* (2024.01)

(52) U.S. Cl.

CPC ............. *G05D 1/6985* (2024.01); *G05D 1/69* (2024.01); *G05D 1/692* (2024.01)

(58) Field of Classification Search

None

See application file for complete search history.

(56) References Cited

U.S. PATENT DOCUMENTS 11,129,323 B2 * 9/2021 Green .................. A01B 79/005
2002/0165649 A1 11/2002 Wilhelm et al.

(Continued)

FOREIGN PATENT DOCUMENTS

EP 3123849 2/2017
EP 3777497 6/2023

(Continued)

OTHER PUBLICATIONS

"International Application Serial No. PCT US2023 063281, International Search Report mailed Jun. 29, 2023", 3 pgs.

(Continued)

*Primary Examiner* — Ramon A. Mercado
*Assistant Examiner* — David Ruben Pedersen
(74) *Attorney, Agent, or Firm* — Schwegman Lundberg & Woessner, P.A.

(57) ABSTRACT

A control system includes an agricultural output characteristic input configured to receive a progressing agricultural output characteristic of a first vehicle performing an agricultural operation. The system includes a second vehicle characteristic input having one or more second vehicle characteristics. A companion guidance controller is configured for communication with the second vehicle. The companion guidance controller includes a companion guidance line generator configured to recursively generate companion guidance line indicia based on the associated progressing agricultural output characteristic and the one or more second vehicle characteristics. A control interface is configured to communicate the companion guidance line indicia to one or more of driving or implement operation elements of the second vehicle.

32 Claims, 7 Drawing Sheets

(56) References Cited

U.S. PATENT DOCUMENTS

| | | | | |
|---|---|---|---|---|
| 2017/0147005 | A1 * | 5/2017 | Ramm | G05D 1/0295 |
| 2021/0026362 | A1 | 1/2021 | Wilson et al. | |
| 2023/0121416 | A1 * | 4/2023 | Maeder | G05D 1/227 701/26 |
| 2023/0124026 | A1 * | 4/2023 | Hansen | G05D 1/0274 701/25 |
| 2023/0189684 | A1 * | 6/2023 | Dix | G05D 1/0221 701/50 |

FOREIGN PATENT DOCUMENTS

| | | |
|---|---|---|
| JP | 2021105771 | 7/2021 |
| WO | 2023164657 | 8/2023 |

OTHER PUBLICATIONS

"International Application Serial No. PCT US2023 063281, Written Opinion mailed Jun. 29, 2023", 7 pgs.

"International Application Serial No. PCT US2023 063281, International Preliminary Report on Patentability mailed Apr. 11, 2024", 9 pgs.

"Australian Application Serial No. 2023226142, First Examination Report mailed Mar. 28, 2025", 3 pgs.

"Canadian Application Serial No. 3,244,317, Office Action mailed Aug. 21, 2025", 5 pgs.

"Australian Application Serial No. 2023226142, Response filed Jan. 6, 2026 to First Examination Report mailed Mar. 28, 2025", 133 pgs.

"Australian Application Serial No. 2023226142, Response filed Mar. 20, 2026 to Subsequent Examination Report mailed Feb. 3, 2026", 135 pgs.

"Australian Application Serial No. 2023226142, Subsequent Examination Report mailed Feb. 3, 2026", 3 pgs.

"Canadian Application Serial No. 3,244,317, Examiners Rule 86(2) Report mailed Mar. 18, 2026", 5 pgs.

"Canadian Application Serial No. 3,244,317, Response filed Dec. 22, 2025 to Office Action mailed Aug. 21, 2025", with English claims, 75 pages.

"Canadian Application Serial No. 3,244,317, Response filed Jul. 17, 2026 to Examiners Rule 86(2) Report mailed Mar. 18, 2026", 24 pages.

* cited by examiner

DYNAMIC GUIDANCE SYSTEM FOR ACCOMPANYING VEHICLE AND METHODS FOR SAME

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc. of Sioux Falls, South Dakota, USA. All Rights Reserved.

CLAIM OF PRIORITY AND INCORPORATION BY REFERENCE

This patent application claims the benefit under 35 U.S.C. § 119(e) of U.S. Provisional Patent Application 63/314,220, filed Feb. 25, 2022, the disclosure of which is hereby incorporated by reference herein in its entirety.

TECHNICAL FIELD

This document pertains generally, but not by way of limitation, to guidance of agricultural vehicles based on the operation of preceding agricultural vehicles.

BACKGROUND

Agricultural vehicles conduct various operations in fields. In some examples vehicles conduct cooperative operations. For instance, a mower cuts hay into windrows as a first operation, and a companion baler collects and bales the cut and dried hay as a second operation. In other examples, a first vehicle conducts a first operation, such as harvesting by a combine, and a companion grain cart is driven proximate to the first vehicle (the combine) to collect the harvested crop as a second operation, for instance from an auger spout. In practice the operator of the companion (second) vehicle observes the position of the output of the first vehicle, such as the windrows, and auger spout or the like and guides the companion vehicle to collect the crop (e.g., windrows, crop from an auger spout or the like) and conduct the second operation. The operator applies a combination of knowledge regarding operation of the first and second vehicles and the operations conducted (e.g., knowhow) and the observed positions to conduct guidance.

In other examples, a first vehicle conducts a first operation in a field, such as mowing. The first vehicle or an associated device, such as a GPS sensor, indexes the location of the first vehicle while conducting the first operation. Upon completion of the first operation (e.g., mowing of a field) the indexed locations of the first vehicle are bundled and submitted to a derivation system to generate a guidance line bundle for a second vehicle. For instance, the indexed locations of the first vehicle appear as indexed points in a field that form serpentine lines or polygons when connected that represent the first operation. These bundled locations are received after the first operation by the derivation system and the derivation system generates a guidance line bundle for the second vehicle based on the completed first operation. The second vehicle receives the guidance line bundle and uses the guidance line bundle to conduct the second operation, for instance autonomously or semi-autonomously.

SUMMARY

The present inventors have recognized, among other things, that a problem to be solved can include the indexed locations of a first vehicle (including one or more preceding vehicles) are poor representations for guidance of a second (companion) vehicle (including a plurality of companion vehicles). The companion vehicle (or vehicles) is often guided by an operator observing the output of the first agricultural vehicle, such as the crop (e.g., windrow, auger spout or the like). The indexed locations of the first agricultural vehicle (or vehicles), in contrast to the crop, are insufficient to guide the companion vehicle in a manner that facilitates conducting of the second operation. Instead, the operator observes the position of the windrow, auger spout or the like and conducts guidance of the companion vehicle relative to the output and not the position of the first vehicle. However, with regard to autonomous or semi-autonomous control systems because GPS or RTK sensors are generally associated with a vehicle and not the agricultural output. The companion vehicle does not have the benefit of the agricultural output of the first vehicle as a control input.

Additionally, the indexed locations of the first vehicle are, in some examples, insufficient for guidance of a second (companion) vehicle. As noted above, the indexed locations of the first vehicle vary relative to its output, and may misalign the companion vehicle relative to the output. Additionally, the companion vehicle has different ground engaging elements, tools or working components, and associated spacing therebetween; steering characteristics; or its agricultural implement is in some examples offset relative to the vehicle, varies with regard to filling or baling, or is distributed along a boom (e.g., in row sections or the like). The indexed locations of the first vehicle when used by the companion vehicle (having its own characteristics) for guidance may inaccurately position the agricultural implement of the companion vehicle relative to the agricultural output (e.g., windrows, auger spout or the like). For instance, the companion vehicle, operating autonomously or semi-autonomously, fails to accurately align its implement with the agricultural output, and in various examples a crop is not fully gathered from a windrow (e.g., for baling), a crop is not accurately received within a grain cart from an auger spout, a hay bale is weighted toward one end and less dense at the opposed end or the like.

In still other examples, indexed locations of preceding (first) agricultural vehicles are in some examples bundled (after completion of the first operation) and relayed to intermediate derivation systems. The derivation system derives a guidance line bundle for a later operating second companion vehicle (e.g., sometimes hours, days or months after the first operation) to follow. The derivation system uses the indexed positions of the first vehicle along with estimated positions of agricultural implements and corresponding output (e.g., wind rows from a mower or a rake; offset for an auger spout from a combine or the like) to generate the guidance line bundle. It takes time to generate the guidance lines for the bundle, for instance the first operation of the first vehicle is completed, and then the indexed locations from the first operation are bundled, submitted, and processed to derive the bundled guidance lines for the second vehicle. Accordingly, a second vehicle conducts its second operation (e.g., baling) after completion of the first operation, such as mowing. Depending upon the turnaround for derivation of the bundled guidance lines the delay may be significant (e.g., days, weeks or longer). The delay in derivation prevents the conduct of a second automated operation, such as a grain collection of crops, that are generally conducted at the same time (e.g., real time or near real time) as harvesting operations, an example of a first operation.

Additionally, if the bundled guidance lines fail to accurately correspond with the position of the output from the first agricultural vehicle the companion vehicle will suffer from the issues noted above, including inaccurate alignment of the companion vehicle implement to the preceding output of the preceding (first) vehicle. In some examples, an operator will intervene to override the bundled guidance lines and guide the second companion vehicle relative to the output as observed by the operator thereby obviating autonomous or semi-autonomous control. In still other examples, the second companion vehicle requires supplemental sensors, controllers or the like to refine and update the inaccurate bundled guidance lines in contrast to operating primarily on the bundled guidance lines.

The present subject matter can help provide a solution to this problem with a control system that guides one or more second (companion) vehicles. The system includes a companion guidance controller that generates an ongoing guidance line for the companion vehicle or companion vehicles (e.g., multiple vehicles operating in cooperation), for instance as an agricultural output characteristic such as location of an agricultural output (e.g., crop, implement, implement output) is progressively generated. For example, as a first vehicle and the associated first implement (including one or more first vehicles and implements) progress in conducting a first agricultural operation the agricultural output characteristic includes an updated location of the agricultural output, for instance as first vehicle and first implement move in the field. As described herein, in one example, the agricultural output characteristic includes one or more of locations of a preceding first vehicle and associated first implement, locations of the first vehicle and first implement in a prior pass or swath, or locations of plural first vehicles and associated implements, or the like.

In one example, the system includes a second vehicle characteristic input that provides one or more inputs used with generation of the companion guidance indicia. In examples, the second vehicle characteristic includes, but is not limited to, one or more of an implement offset (of the second implement of the second vehicle), implement characteristics (dimensions, capabilities or the like), row section count, row section spacing, or specified leading offset between the first and second vehicles or implements (e.g., with a grain cart and combine operation). In other examples, the second vehicle characteristic includes one or more of static or dynamic values. One example of a dynamic second vehicle characteristic includes a fill value of a grain cart corresponding to fill levels in zones of the grain cart provided with load sensors, level sensors, cameras or the like. Another example of a dynamic second vehicle characteristic includes a bale weight with respect to the width of the bale or weight accumulated at one or more locations along the width (e.g., ends, middle or the like). One or more of load sensors, cameras or the like are coupled with the baler to sense the bale weight. In still other examples, the second vehicle characteristic includes observed positions of the agricultural output proximate to the second vehicle including cameras, lidar, radar, ultrasound sensors or the like that detect windrows, furrows, rows, harvested or unharvested crops. As discussed herein the second vehicle characteristics detected with the second vehicle sensors are optionally used with the companion guidance line generator to refine the guidance line indicia.

The companion guidance controller receives the progressing agricultural output characteristic and optional second vehicle characteristic. A companion guidance line generator recursively generates companion guidance line indicia (e.g., points, segments or the like) as the progressing agriculture output characteristic is received. The companion guidance line indicia are generated from the progressing agricultural output characteristic (e.g., first implement locations, crop locations or the like) as the characteristic progressively changes, for instance as the agricultural output location changes. The recursive generation of guidance line indicia facilitates the ongoing control of the second vehicle relative to the first vehicle while the first vehicle is conducting its first operation, and the vehicles in some examples operate together and cooperatively in the field. Optionally, the companion guidance controller includes an indicia assembler that assembles or 'stitches' the companion guidance line from the generated guidance line indicia. For example, the indicia assembler interconnects generated indicia (points or segments) to previously generated indicia (previously generated points or segments).

By recursively generating guidance line indicia time consuming bundling of a completed operation and the associated first vehicle locations as well as derivation of a guidance line bundle for the second vehicle, and implementation of guidance by way of the guidance line bundle are thereby minimized (e.g., avoided or decreased). Instead, the guidance line indicia for the second vehicle (or second vehicles) are generated in an ongoing manner optionally as the agricultural output characteristic of the preceding first vehicle (or vehicles) are indexed and analyzed with the systems described herein.

A control interface receives the guidance line indicia and, in one example, communicates the guidance line indicia to one or more of driving or implement operation elements of the second vehicle. The companion guidance controller thereby conducts guidance of the second vehicle in a cooperative manner with the first vehicle. As shown herein, in one example, the second vehicle follows the first vehicle in a same time fashion (e.g., real time or near real time) thereby permitting cooperate interaction between the vehicles and implements. In another example, the second vehicle cooperatively interacts with the first vehicle through the use of agricultural output characteristics from a preceding pass or swath of the first vehicle to permit offloading of crops to a grain cart from a combine. Optionally, the second vehicle (the grain cart in an example) is able to 'lead' the first vehicle (a combine) the companion guidance controller.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In certain agricultural applications, there are multiple vehicles for conducting agricultural operations in the same field. For instance, agricultural operations include, but are not limited to, harvesting, gathering, planting, mowing, cutting, spraying, cultivating, baling or the like. In each of these examples, there is potential for vehicles to work cooperatively, or separately in the field at the same time or different times. In one example, a first vehicle performs a first activity and a second vehicle performs a second activity related to the actions of the first vehicle. For instance, the first or primary vehicle is equipped to conduct a first agricultural operation such as planting, cutting, mowing or the like. The second, or companion, vehicle is equipped to conduct a second, or companion, agricultural operation (same or different as the first vehicle) such as planting, bailing, spraying, spreading or cultivating, crop transport or the like. The second vehicle follows signals, such as GPS indexed positions, from the first vehicle. The second vehicle performs the second agricultural operation in response to the signals (e.g., following the GPS indexed positions) from the first vehicle.

Figure 1:
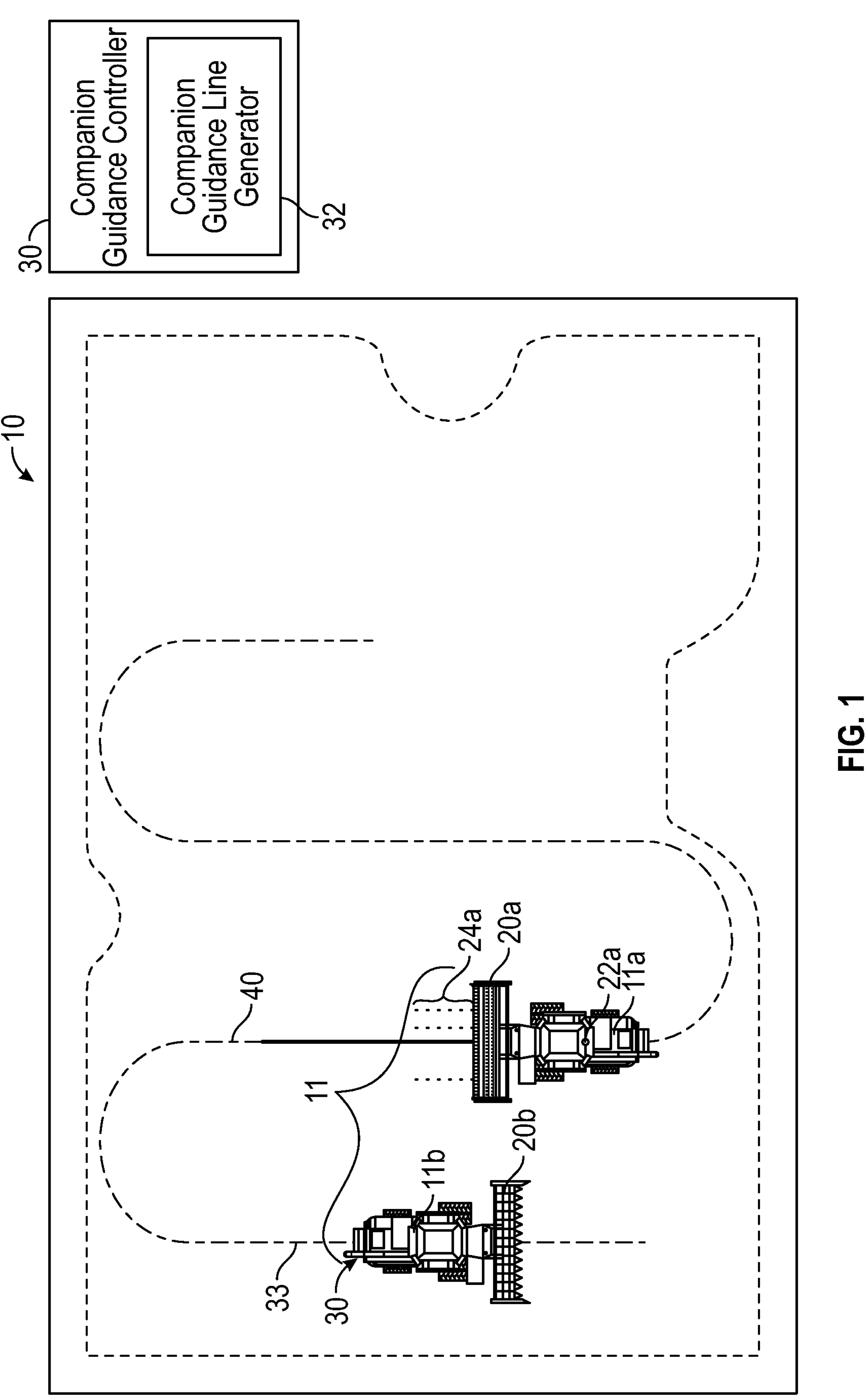
FIG. 1 is a plan view of one example of a cooperative agricultural vehicle operation including a leading vehicle.

FIG. 1 is a schematic illustration of an agricultural system 10 including a vehicle team 11. The vehicle team 11 includes at least two independent vehicles, for example a first vehicle 11*a* and a second vehicle 11*b*. The first vehicle 11*a* (including one or more first vehicles) is, in one example, configured to perform a first agricultural operation (including one or more first agricultural operations), or have a first implement 20*a* (including one or more first implements) associated with the first vehicle 11*a* to perform the first agricultural operation. The second vehicle 11*b* (including one or more second vehicles) is, in another example, configured to perform a second agricultural operation (or multiple second agricultural operations, or series of subsequent agricultural operations), or have a second implement 20*b* (including multiple implements) associated with the second vehicle 11*b* to perform the second agricultural operation along a specified companion guidance line 40. The second agricultural operation is, optionally, conducted contemporaneously to the first agricultural operation. In another example, the second agricultural operation is conducted some time after the first agricultural operation (e.g., hours, days, weeks or later in the season).

In an example, at least one of the first vehicle 11*a* has the first implement 20*a* coupled thereon, and the second vehicle 11*b* has the second implement 20*b* coupled thereon. In an example, the first vehicle first vehicle 11*a* and second vehicle 11*b* work together contemporaneously (e.g., at the same time or near to the same time, such as within minutes). In another example the second vehicle 11*b* uses data received from the first vehicle 11*a* after time has passed of the first vehicle 11*a* acquiring or generating the data, such as hours, days, weeks, or any time as dictated by the task and logged by the first vehicle 11*a* or logged by the agricultural system 10.

In an example, the first vehicle 11*a* and the second vehicle 11*b* work in cooperation with each other and through the use of electronic or digital signals or computer programing. The first vehicle 11*a* has a sensor that, for example, transmits and processes a recursive (ongoing, continuously, or the like) agricultural output characteristic contemporaneously with the first vehicle 11*a* performing an agricultural operation. For example, the first vehicle 11*a* has a first sensor 22*a* coupled with a part of the first implement 20*a* corresponding to the working element of the first implement 20*a*. The first sensor 22*a* is, for example, a location sensor that indexes, records, transmits the agricultural output characteristic 24*a* (location) of a tool of the first implement 20*a* or the first implement 20*a* itself. The first sensor 22*a* optionally recursively (continuously) transmits the agricultural output characteristic 24*a* (location), or data, of the tool of the first implement 20*a*. The data from the first sensor 22*a*, in one example, is transmitted to a companion guidance controller 30.

The companion guidance controller 30 for example, receives data or information communicated or transmitted from the first sensor 22*a* to the second vehicle 11*b* or, optionally, the second implement 20*b*. For example, the companion guidance controller 30 utilizes an agricultural output characteristic 24*a* (location) from the first sensor 22*a* recursively (continuously, ongoing, progressively, or the like) as an agricultural output characteristic input. The companion guidance controller 30 optionally uses the recursively generated agricultural output characteristic input to form, for example, a companion guidance line 40.

The companion guidance controller 30 receives data from specified inputs, such as the agricultural output characteristic, the second vehicle characteristic, and the like. The companion guidance controller 30 also converts the inputs using a companion guidance line generator 32 to recursively generate outputs such as the companion guidance line 40. For example, companion guidance line indicia 33 based on the associated progressing agricultural output characteristic and the one or more second vehicle characteristics are used to generate the companion guidance line 40.

The companion guidance line generator 32 utilizes data transmitted to an indicia assembler corresponding to characteristics of the second vehicle 11*b* or the second implement 20*b*. The indicia assembler provides additional information to generate the companion guidance line for the second vehicle including appending generated companion guidance line indicia with preceding companion guidance line indicia. The companion guidance line indicia include, for example, information or data corresponding to one or more second vehicle characteristics include one or more of static or dynamic second vehicle characteristics.

The companion guidance line 40 is an example of a compilation of data such as each of the inputs related to the agricultural output characteristic 24*a* from the first sensor 22*a* and companion guidance line indicia 33 with the agricultural output characteristic. The companion guidance line 40 is a representation of the course or path the first implement 20*a* travelled when operating or working in the field. The companion guidance controller 30 transmits the companion guidance line 40 to the second vehicle 11*b*, or optionally, the second implement 20*b*. The second vehicle 11*b*, or optionally the second implement 20*b*, follows a path in the field that corresponds to the companion guidance line 40.

In an example agricultural system 10, the first vehicle 11*a* is a tractor with a planter as the first implement 20*a*. The planter is coupled with the tractor and follows the tractor. The planter optionally has at least one sensor coupled at a specified location to index (records, stores or the like) information related to the operation of the planter. In an example, the sensor is a position sensor that records information related to the location where seeds have been planted. In an example, the planter has a sensor coupled to at least one seed gate or at least one seed metering device. The sensor indexes (collects, records, or the like) an agricultural output characteristic such as information corresponding to a location in a field where the seeds have been planted. The data from the first sensor is optionally converted into a companion guidance line via a guidance controller that corresponds to the path the planter traveled during use. The companion guidance line, in one example, is an accumulation of progressive indicia associated with each agricultural output characteristic combined with characteristics of the planter (size, offsets, planter characteristics, row section count, row section spacing, specified leading offsets, etc.).

The information accumulated (compiled, combined, or the like) from the guidance controller is, optionally, relayed (transmitted, sent or the like) to a control interface of the second vehicle or second implement, such as a tractor or a sprayer, contemporaneously or after a period of time has passed. The driving or implement operation elements are, for example, associated with the control interface such that the control interface provides information for proper alignment and performance during operation.

In the example with the second vehicle 11*b* as a tractor with a sprayer as a second implement 20*b*, the sprayer receives data relayed from the companion guidance controller after a period of time (days, weeks or the like) has passed from the first agricultural operation (e.g., planting). For example, the data is transmitted to a storage system (e.g., processor, cloud, computer or the like) and retrieved at a time specified by the agricultural operation. The companion guidance line controller generates a guidance line that indicates the location where each gate or metering device was when the planter planted the seeds. The tractor or the sprayer implements the companion vehicle guidance line as the path the tractor or sprayer follows during operation.

In another example, the first vehicle 11*a* is a combine used for harvesting. In an example, the second vehicle 11*b* is a companion vehicle such as a second tractor or utility vehicle and the second implement 20*b* is a grain cart or other machine configured to collect grain. The second tractor or utility vehicle with the grain cart operates contemporaneously with the combine. In an example, the second tractor precedes the combine to assist with the placement of the grain cart in relationship to the combine.

In an example of the combine operating with an associated collecting tank, at least one of the first tractor or a portion of the combine, such as an unloader, has at least one first sensor coupled at specified location. The first sensor indexes (collects, records, or the like) the position of a portion of the combine such as the unloader (as the first agricultural output characteristic). In an example, the first agricultural output characteristic is relayed (transmitted, sent or the like) as an input to a guidance line controller. In an example, the guidance line controller assembles any inputs such as the first agricultural output and any second vehicle characteristic inputs into a guideline corresponding to the path the combine travels during use or the path the transport belt follows during use.

In an example with the second tractor and the grain cart, at least one of the second tractor or the grain cart receives data corresponding to the guidance line to properly align the grain cart with the unloader. The companion guidance line is transmitted, optionally, contemporaneously or at a predetermined interval to the second tractor or the grain cart. In an example, the grain cart continues to travel through the field with the combine by following the guidance line data transmitted from the first sensor to the guidance line controller.

Figure 2:
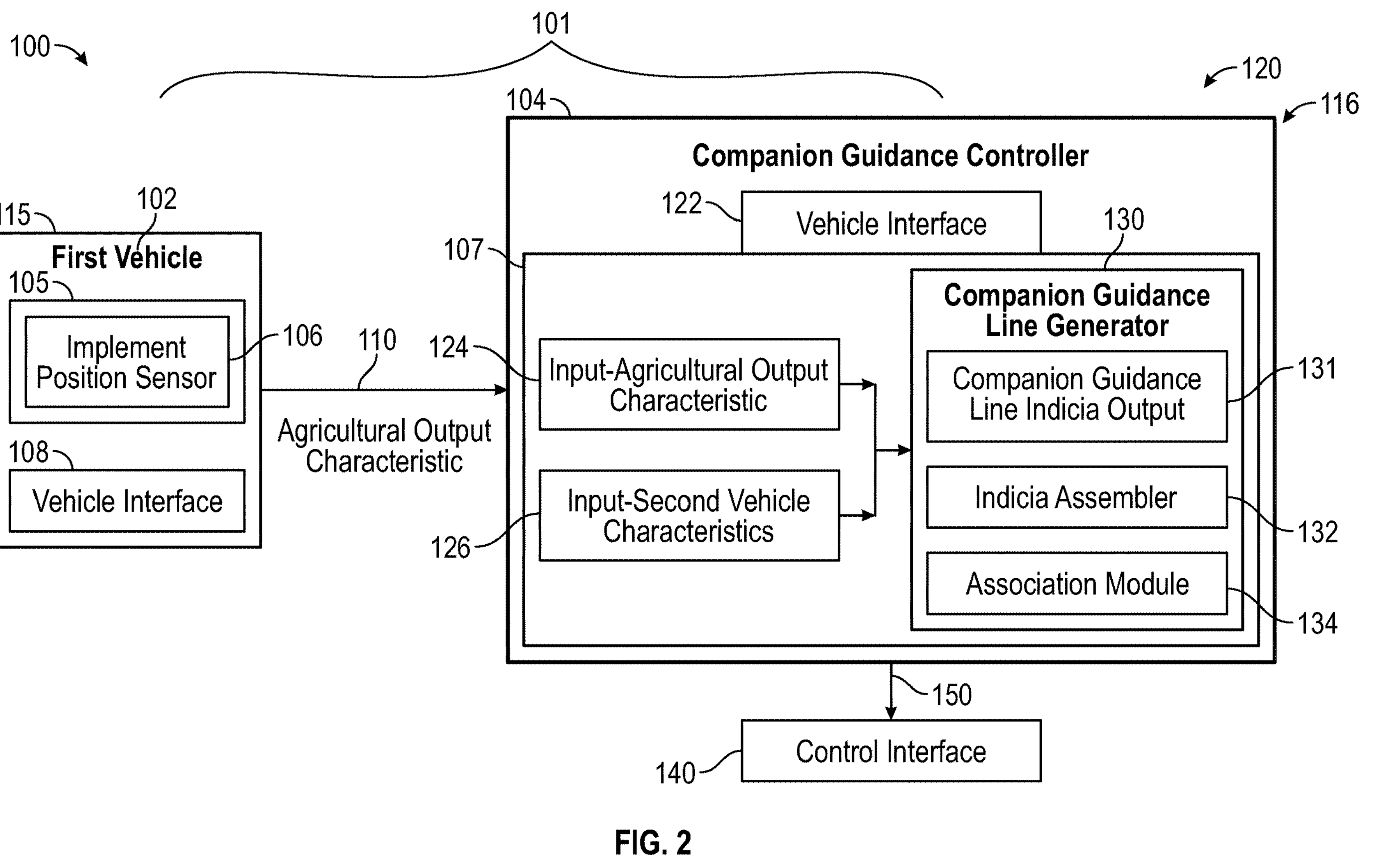
FIG. 2 is a schematic diagram of one example of a companion guidance system having a companion guidance controller.

FIG. 2 is a schematic illustration of an agricultural system 100 including a vehicle team 101 (shown with separate boxes in FIG. 2). For example, the vehicle team 101 includes at least a first (or primary) agricultural vehicle 102 and a companion (second) agricultural vehicle 104. The agricultural system 100 includes at least one electronic communication system (radio, cellular, Wi-Fi or the like) for transmitting signals, messages, or the like between one or more companion vehicle 104, one or more of the first vehicle 102, a separate unit (such as a cloud system, remote process or the like).

The first vehicle 102, in an example, is an agricultural vehicle such as a tractor, combine or the like or utility vehicle such as a construction vehicle. The first vehicle 102 is configured to perform a first agricultural operation or have an associated implement perform a first agricultural operation. In an example, the first vehicle 102 performs a first agricultural operation including, but not limited to, planting, cutting, mowing, soil cultivation or preparation, harvesting or the like. The first vehicle 102 includes any vehicle suitable for the intended purpose, such as a tractor, planter, cultivator, harrow, harvester, combine or mower. In an example, the first vehicle 102 performs an agricultural operation that is followed with a secondary or follow-up agricultural operation (or operations) contemporaneously or in the future. For example, a mower cuts crops or other plants and leaves behind the cut grass in the field. In another example, a harvester or combine cuts or gathers crop. In some examples, the harvest or combine deposits the cut crops in the field.

The companion vehicle 104, in an example, includes an agricultural vehicle that conducts an associated agricultural operation to the agricultural operation of the first vehicle 102. For example, a companion agricultural operation conducted by the companion vehicle 104 includes, but is not limited to, planting, bailing, crop treatment (spraying, spreading or cultivating), crop transport, or preparation. For example, a companion vehicle 104 to a mower gathers the cut crops or plants from the field and optionally bails the grass. In another example, the companion vehicle 104 gathers harvested crops in the manner of a grain cart.

In an example, the agricultural system 100 includes the vehicle team 101 with each first vehicle 102 and second (companion) vehicle 104 fit with separate, operational implements. An example vehicle team 101 includes the first vehicle 102 with a first implement 105 and the companion vehicle 104 with a companion (or second) implement 107. The first implement 105 and the companion implement 107 optionally cooperate to perform an aggregate agricultural operation including, for example, at least two steps. In an example, the first implement 105 is a first component coupled to the first vehicle 102 to perform a first step in the agricultural operation. The first implement 105 is, for example, a mower, planter, sprayer, tiller, combine harvester head or the like. The first implement 105 optionally refers to a portion of the implement, such as an auger spout of an auger or a nozzle of a sprayer.

In one example, a first sensor 106 is optionally coupled with (e.g., proximate to, or coupled at any point along) the first implement 105. For example, the first sensor 106 is coupled to the first vehicle 102 or the first implement 105, or both. For instance, the first sensor 106 is coupled on the first vehicle 102 and offset proximate to the first implement 105. The first sensor 106 includes, but is not limited to, a position sensor that indicates the location or the position (x, y, z coordinates; RTK coordinates, GPS coordinates, yaw, pitch or roll or similar) of the implement, such as a portion or tool thereof, including a nozzle, cultivator shovel, row unit or the like including additional instances of the implement displaced from a first instance of the implement (e.g., a second, third, fourth nozzle spaced from a first nozzle or similar). The first sensor 106 includes, but is not limited to, a GPS sensor, a RTK sensor or the like.

In an example, the first sensor 106 is associated with the first implement 105 of the first vehicle 102. The first sensor 106 is configured to index the or location of the first implement 105. In one example, the first sensor 106 as a position sensor provides indexed locations of the first implement 105. In another example, the position sensor indexes the output of the first implement 105. Optionally, the position sensor 106 is provided on the first vehicle 102 and an offset is accounted for to virtually locate indexed positions of the first implement 105 (e.g., nozzle locations, cultivator shovels, row units or the like) or output (e.g., cut crop, cultivator lines, crop furrows, planted seeds or the like) of the first implement 105. The offset, in an example, includes positions of tools that are part of the first implement 105, such as individual nozzle locations on a sprayer. With a first sensor 106 coupled to individual tools on the first implement, or with an offset accounted for in the first sensor 106, a more accurate the agricultural output location is indexed.

In another example, the first sensor 106 is associated with the location of the first implement tools, including but not limited to, a nozzle, cultivator shovel, row unit or the like. For instance, the first sensor 106 is several first sensors 106 and each first sensor 106 is located on each of, for example, a plurality of nozzles that dispense an agricultural product to specific locations in a field (agricultural output characteristic). In other words, the several first sensors 106 each index the output of the first implement tools at specific locations in the field (indicia). Referring back to FIG. 1, the several first sensors would index the indicia corresponding to the agricultural outputs 24*a* as an example of a progressing agricultural operation.

Referring again to FIG. 2 illustrates the agricultural system 100 ready to conduct agricultural operations with the first vehicle 102 and second vehicle 104. In the example system, the first vehicle 102 includes a first vehicle system 115 (e.g., a processor including circuits, memory and similar) that generates and indexes an agricultural output characteristic 110 of the first vehicle 102 such as position of the first implement 105, portions of the first implement 105, output (e.g., crops or the like). The first vehicle system 115 includes, for example, a first sensor 106 (such as a position sensor) and a vehicle interface 108. The vehicle interface 108 is an example of a component that communicates data collected from the first sensor 106 to the companion (second) vehicle 104. In another example, the first sensor 106 generates an agricultural output characteristic 110 related to the data received from the first sensor 106. The vehicle interface 108 is at least one of, a wireless means of communication such as radio, cellular, wireless local area networks (WLAN) or the like including a modem, a transceiver or the like. Optionally, there is an intervening station between the vehicle interface 108 and companion vehicle 104 such as a cloud-based system, router, server or the like. The vehicle interface 108 interconnects the first vehicle 102 and first implement 105 having the first sensor 106 as an associated position sensor with the companion vehicle 104 and its second vehicle system 116 (e.g., with its own processor). In another exemplary arrangement, the vehicle interface 108 interconnects the first vehicle 102 and first implement 105 having the associated position sensor 106 with an associated server, cloud-based or otherwise.

As further illustrated in FIG. 2, the first vehicle 102 optionally transmits the agricultural output characteristic 110. The agricultural output characteristic 110 is, optionally transmitted, processed, sensed or the like, in a recursive manner by radio, Wi-Fi signals, stored and downloaded on a computer, computer compatible drive or processor, or the like. In an example, the agricultural output characteristic 110 is transmitted recursively (e.g., ongoing, progressively, continuously, automatically at predetermined intervals, or manually in a regular manner).

In an example, the at least one agricultural output characteristic 110 represents the output of the agricultural operation that is recorded or indexed in recursive (ongoing, continuous, at specific intervals or the like) manner. For example, the agricultural output characteristic 110 is at least one of each indicia (location) of a cut crop location, planted crop row, sprayed crop row, swaths or any similar agricultural operation performed by an agricultural vehicle or agricultural implement. As will be discussed further, the at least one agricultural output characteristic 110 is optionally communicated (e.g., transmitted, relayed or the like) to the companion vehicle 104. For example, during operation of the first vehicle 102 the at least one agricultural output characteristic 110 includes one or more of an updated, refreshed or revised indicia representing location or related kinematics of the first implement 105 of the first vehicle 102. In another example, the at least one agricultural output characteristic 110 includes one or more indicia that are recorded or indexed in an ongoing manner, for instance corresponding to location or related kinematics of one or more tools, component or the like of the first implement 105 (e.g., nozzles, cultivator shovels, row units or the like). For example, the at least one agricultural output characteristic 110 is relayed to the companion guidance controller 120 and updated as the first vehicle 102 and the first implement 105 conduct the agricultural operation. The companion guidance controller 120 collects the updated agricultural output characteristic 110 (of the first implement, first vehicle, associated tools or components or the like) and, as discussed herein, generates corresponding companion guidance line indica based on the agricultural output characteristic 110.

In another example, the agricultural output characteristic input 124 is, optionally, relayed to a remote storage system (e.g., cloud, physical server, or the like) to be indexed (recorded, stored or the like) for future use (e.g., minutes, hours, days, weeks). For example, the companion guidance controller 120 retrieves the agricultural output characteristic input 124 from the cloud-based storage and processes the agricultural output characteristic 110 input along with the second vehicle characteristic inputs 126 when the second vehicle 104 is about to, or does, perform its agricultural operation.

As shown in the example of FIG. 2, the companion guidance controller 120, such as a processor having circuits, memory and the like receives the indexed information related to the at least one agricultural output characteristic 110 at the agricultural output characteristic input 124 such as a transceiver, wireless modem or the like. For instance, the agricultural output characteristic input 124 receives the at least one agricultural output characteristic 110 and generates an agricultural output characteristic input for a companion guidance line generator 130 (described further herein). The companion guidance controller 120 optionally receives one or more companion vehicle characteristics as a companion vehicle characteristic input 126. The companion vehicle characteristics include, but are not limited to, one or more of static or dynamic inputs (implement position, vehicle position, kinematics, agricultural output or the like) for the second (companion) vehicle 104 and the second implement 107.

In an example, the agricultural output characteristics 110 for one or more of the first vehicle 102, the first implement 105, or associated components and the second vehicle characteristics of the second vehicle 104, the second implement 107 or the like the are provided to the companion guidance line generator 130 with a vehicle interface 122. The vehicle interface 122 includes one or more of wired or wireless interconnections, such as a bus, CAN bus or the like that receives and distributes the characteristics described herein for analysis and generation of companion guidance lines. In one example, the vehicle interface 122 is a component of the companion guidance controller 120 onboard the companion (second) vehicle 104. In another example, the vehicle interface 122 (and optionally the companion guidance line generator 130) are remote components in wireless communication with the inputs 124, 126. For instance, the vehicle interface 122, the companion guidance line generator 130 and other components of the companion guidance controller 120 are a cloud-based system or router.

Referring again to FIG. 2, the companion guidance line generator 130 is a system (processor, circuits, computer software, or the like) that receives one or more of the agricultural output characteristics 110, second vehicle characteristics or the like from the associated inputs 124, 126 and generates one or more companion guidance lines 150 for the companion vehicle 104. For example, the companion guidance line generator 130 generates the one or more companion guidance lines 150 based on an aggregate of data related to the guidance line indicia, that as stated previously, is optionally based at least partially on the agricultural output characteristic 110 received at times and/or locations according to the purpose. The companion guidance line generator 130 in another example generates guidance line indicia based on the characteristics. The companion guidance line generator 130, optionally, assembles guidance line indica to previous guidance line indicia as generated. For example, the first vehicle 102 generates an agricultural output characteristic 110 on a recursive basis and transmits the agricultural output characteristic 110 to the companion guidance line generator 130. The companion guidance line generator 130 compiles the associated progressing agricultural output characteristic as an input and processes the data. The agricultural output characteristic 110 optionally accounts for any offset characteristics of the first implement 105 or the location of the agricultural output.

The companion guidance line generator 130 includes, for example, one or more of a companion guidance line indicia output 131 representative of a companion guidance line indicia, an indicia assembler 132 and an association module 134. The companion guidance line indicia output 131 includes companion guidance line indicia used for guidance of the companion vehicle 104. In an example, the guidance line indicia are based on the indexed information related to the agricultural output characteristic 110 and a corresponding second vehicle characteristic (such as location of the second vehicle 104 or the second vehicle implement 107). Various examples of companion guidance line indicia and assembled guidance lines are illustrated in the FIGS. 3, 4, 5 and 6 and described herein.

As previously discussed, the companion guidance controller 120 includes the companion guidance line generator 130. The companion guidance line generator 130 (as shown with examples herein) generates indicia for a companion guidance line based on the ongoing generated agricultural output characteristics 110. Stated another way, as agricultural output characteristics 110 are generated with the first vehicle 102 and relayed to the companion guidance controller 120, the companion guidance line generator 130 of the companion guidance controller 120 generates corresponding guidance line indicia based on those received agricultural output characteristics 110, for instance without delaying for bundling and analysis of characteristics collected from a full or nearly complete agricultural operation of the first vehicle 102.

The generated companion guidance line indicia are guidance locations, waypoints, line segments or the like that permit autonomous guidance of the companion (second) vehicle 104 in a manner that is based on the agricultural output of the first vehicle 102 (e.g., its vehicle position, implement position, implement tool positions, kinematics or the like) and permits high resolution guidance of the companion vehicle 104 relative to the operation of the first vehicle 102. For instance, the companion guidance line indicia output 131 permit the accurate alignment of the companion implement 107 of the companion vehicle 104 with the agricultural output characteristic 110 from the first vehicle 102 (e.g., crop rows, mounds, cut crops, first implement position, implement tool positions of the first implement or the like). More specifically, the companion (second) vehicle 104 and its associated implement may in some ways 'track' or emulate the path or travel of the first vehicle 102, its implement, implement tools, cut crop or the like (agricultural output characteristics 110) while further refining guidance to account for the companion (second) vehicle characteristic inputs 126 (e.g., kinematics, dimensions of the second implement or the like). The companion guidance line generator 130 and the generated companion indicia output 131 permit tracking of the first vehicle 102, and furthermore permit high resolution and accurate positioning of the second implement of the companion vehicle relative to the agricultural output of the first vehicle.

As the companion guidance line indicia are generated (e.g., with the companion guidance line output 131 shown in FIG. 2) the indica are, in another example, appended to the previously generated indicia with the indicia assembler 132. For instance, as previously described, the generation of the companion guidance line is a recursive (ongoing, continuous, at specific intervals or the like) procedure conducted by the companion guidance line generator 130 as the companion guidance generator 130 receives at least progressing agricultural output characteristics 110 of the first vehicle 102 (including its implement, crop position or the like). As companion guidance line indicia are generated from the progressing agricultural output characteristics 110 the indicia assembler 132 adds the newly generated companion guidance line indicia to the previously generated indicia, thereby effectively generating a guidance line in an ongoing manner. The indicia include, but are not limited to, locations, points, segments or the like based on the agricultural output characteristics 110, second vehicle characteristic inputs 126 or the like. The indicia assembler 132 optionally interconnects each of the points, segments or the like to form an interconnected guidance line. In another example, the indicia assembler 132 includes compiling the indicia and generating a guidance line based on curve fitting, algorithms or the like.

Optionally, the guidance line indicia are generated as values corresponding to static or dynamic offset relative to the agricultural output characteristic 310. In one example, the companion guidance line generator 130 recursively generates companion guidance line indicia based on corresponding agricultural output characteristics 110. For instance, the guidance line indicia 332 shown in FIGS. 4B and 4C vary in lateral position in comparison to associated agricultural output characteristic 310. In this example, the companion guidance line generator 130 includes an association module 134 (in FIG. 2) that associates the guidance line indicia 334 (e.g., $S_1$, $S_2$ or the like) with the corresponding agricultural output characteristic 310 (e.g., $P_1$, $P_2$ or the like) to ensure each of the guidance line indicia 334 match up with the agricultural output characteristics 310 that serve as their basis.

In an example, the companion guidance line indicia output 131 are relayed, transmitted or the like to an indicia assembler 132. The indicia assembler 132 assembles, or assists in assembling, the companion guidance line. The indicia assembler 132 receives each input of the progressively updated companion guideline indicia. The indicia assembler, in one example, continuously updates, amends, or the like one indicia with the next indicia.

In another example, the companion guidance indicia output 131 is transmitted, relayed, or the like to an association module 134. The association module 134 indexes each companion guidance line indicia relative to the discrete agricultural output characteristic 110. The association module, in one example, recursively or continuously updates or repeats indexing the companion guidance line indicia relative to the discrete agricultural output characteristic.

The companion guidance line generator 130 of the companion guidance controller 120 optionally transmits, relays or otherwise communicates companion guidance line data to a companion vehicle control interface 140 associated with the companion vehicle 104. The companion vehicle control interface 140 includes, for example an automated driving interface (drive by wire processor, linkages with electromechanical, hydraulic or pneumatic actuators) in communication with one or more of steering, throttle, brake, transmission, motor or other driving components (and optionally implement components) of the companion vehicle. The control interface 140 optionally also includes an output device such as a monitor, haptic feedback in a steering interface or the like.

Optionally, the companion guidance line generator 130 is compiled or otherwise generated as data is received or communicated, or shortly after the agricultural output characteristic input 124 has been received. In another example, the companion guidance line generator 130 receives the agricultural output characteristic input 124 contemporaneously as the at least one agricultural output characteristic 110 is receiving and transmitting the data. The accumulation of data from the agricultural output characteristic input 124 and, optionally, the companion vehicle characteristic inputs 126 is converted to a companion guidance line, as will be discussed further.

Figure 3:
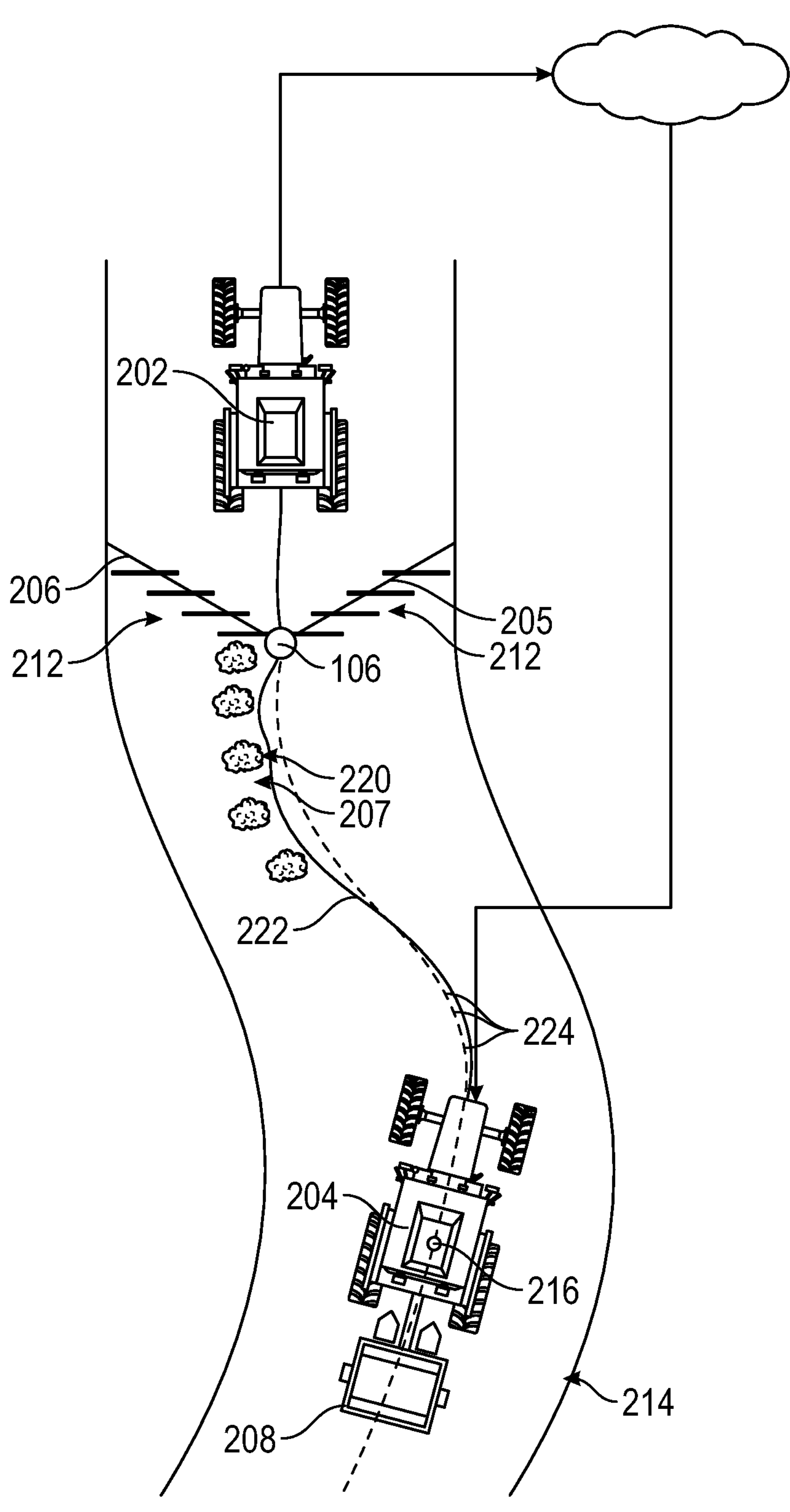
FIG. 3 is a plan view of one example of cooperative agricultural vehicle operation with the companion guidance controller.

FIG. 3 is an illustration of an example of a first agricultural vehicle 202 coupled with a first agricultural implement 206 and a companion (second) agricultural vehicle 204 coupled with a second agricultural implement 208. In this example, the first agricultural vehicle 202 is a tractor and the first agricultural implement 206 includes a mower while the second agricultural vehicle 204 is a second tractor and the second agricultural implement 208 includes a baler. In the example shown in FIG. 3, the companion agricultural vehicle 204 contemporaneously follows the first agricultural vehicle 202 or proceeds along the same, or similar path, as indicated by the first agricultural vehicle 202 after a period of time has passed. In an example, the time that has passed is minutes, days, weeks or a period of time as specified by the operation, the operator (e.g., user) or the like.

The first agricultural vehicle 202 and the second agricultural vehicle 204, and any corresponding agricultural implements 206, 208 are associated with the agricultural system 100 shown in FIG. 2. In an example, the first agricultural vehicle 202 performs a first agricultural operation 212 such as cutting, mowing or the like (and in other examples agricultural operations such as combining, planting, cultivating or the like). The first agricultural implement 206 is, for example, a mower or the like.

In the example illustrated in FIG. 3, the first agricultural implement 206 has the first sensor 106 (also see FIG. 2). The first sensor 106 is in an example a position sensor. For instance, the first sensor 106 is an agricultural output sensor that indexes the position of the first agricultural implement 206 as the agricultural output characteristic. In another example, the first sensor 106 indexes a portion 205 of the first agricultural implement 206, such as an implement tool (or tools), fiducial or reference location of the implement or the like. The portion 205 of the first agricultural implement 206 (such as the mower) includes, but is not limited to, a cutting knife (or knives), funneled output, an auger spout, cultivator shovel, spray nozzle or the like. In another example, the first sensor 106 indexes the output crops 207 such as windrows of grass, funneled or piled crops, planted seeds, or the like. The location of one or more instances (including all instances) of the first agricultural operation 212 (e.g., spray application, seed deposition, deposition of hay, etc.) is an example of an agricultural output position 220 another example of agricultural output characteristic. Each agricultural output position 220 is, for example, a companion indicia that is transmitted to the companion guidance controller 120, for instance associated with the second agricultural vehicle 204.

The input of the agricultural output position (an example of an agricultural output characteristic) includes, but is not limited to, measured characteristics of the first implement 206 operation (e.g., windrow location, windrow volume, windrow density or mass, row section position, positions of row sections, spray nozzle location or locations or the like). In other examples, the agricultural output position (e.g., an agricultural output characteristic) is another measured characteristic monitored by the first implement sensor and includes, but is not limited to, first implement 206 position such as mower outlet, nozzle positions or spacing, harvester head position, cultivator shovel, tiller disk or the like; crop output position such as locations of windrows, planted seeds, spray application, cultivator furrows or the like as specified by the agricultural operation or the companion guidance controller 120. The positions or locations include one or more of indexed locations in a field map (x, y, z coordinates; RTK coordinates, GPS coordinates, yaw, pitch or roll or similar), and optionally include an associated time stamp (e.g., the time of planting, time of mowing or the like).

As illustrated in FIG. 3, the second agricultural vehicle 204 is coupled with a second implement 208 in this example a baler, and in other examples a sprayer, cultivator, grain cart or the like. The second agricultural vehicle 204 optionally conducts a second agricultural operation 214 such as baling, or in other examples, planting treatment (spreading, spraying, cultivating), crop transport or the like. The second agricultural operation 214 is a cooperative operation with the first agricultural operation 212. In an example cooperative operation such as mowing the field, as the first agricultural operation 212 and baling, as the second agricultural operation 214, are conducted after a specified time has passed, such as hours, days, weeks or as specified by the agricultural operation. In another example, the second agricultural operation 214 is conducted simultaneously to the first agricultural operation 212 (e.g. the same time, the second agricultural operation 214 is conducted immediately after the first agricultural operation 212, the second agricultural operation 214 is conducted after preceding pass of the first operation 212, the second agricultural operation 214 is conducted after a preceding pass of the first agricultural operation 212, the second agricultural operation 214 is conducted within a day or a week relative to the first agricultural operation 212).

One or more of the second vehicle 204 or the second implement 208 includes a second vehicle sensor 216, such as a position sensor (e.g., GPS, RTK or the like). In one example, the second vehicle sensor 216 provides position information for one or more of the second vehicle 204, the second implement or the like to facilitate autonomous or semi-autonomous driving, for instance relative to the companion guidance line indicia based on the associated progressing agricultural output characteristic generated with the companion guidance line generator 130 (see FIG. 2). In another example, the second vehicle sensor 216 monitors one or more features or functions of the second implement, including a location of a baler mouth, spray nozzle (or nozzles), cultivator shovels, row sections or the like. As previously described one or more of position, features, or functions of the second implement 208, the second vehicle 204 or the like are static or dynamic, and accordingly the second vehicle sensor 216 (including sensors) optionally monitors each for inclusion with generation of the companion indicia.

In one example of a second vehicle sensor 216, the second vehicle sensor 216 monitors one or more features of the second implement 208, such as a baler mouth or intake. The monitored feature of the second implement 208 includes, but is not limited to one or more of position, orientation (e.g., heading), crop volume in the bale mouth or the like. The monitoring of the second implement 208 is, optionally, an input used in generating the companion guidance line indicia 224. The monitored feature (or features) of the second implement 208, and optionally position information of the second vehicle 204, are example values provided with the second vehicle characteristic inputs 126 (see FIG. 2) and are included in generation of the companion guidance line indicia 224 (along with the agricultural output characteristic). With the monitored functions and position of the second vehicle 204 (and optionally the second implement 208) as the second vehicle characteristics these values are input to the companion guidance line generator 130 and compiled with the agricultural output characteristics to generate the companion guidance line indicia.

In an example, the baler (as the second vehicle 204) follows a companion guidance line 222 where baling (as the second agricultural operation 214) occurs along the companion guidance line 222. The companion guidance line 222 is generated from the companion guidance line generator 130 (see FIG. 2). The companion guidance line generator 130 recursively generates (produces, determines, compiles, accumulates) companion guidance line indicia 224 based on monitoring by the implement position sensor 106, the second vehicle sensor 216 or the like. The companion guidance line 222 is, for example, assembled from the companion guidance line indicia 224.

The companion guidance controller 120 receives and digests the location of the mowed crop (e.g., as generated, for instance by cutting), as an example of agricultural output position 220. The companion guidance controller 120 processes the continuously received input of agricultural output position 220, and generates companion guidance line indicia 224 based on the tractor and baler characteristics (e.g., location of the implement, volume and density of deposited crop). In an example, bundling of the agricultural output position 220 including the completed first agricultural operation 212 of mowing within a field and processing of the completed operation 212 to generate the companion guidance line 222 is not necessary. Instead, the companion guidance controller 120 generates the companion guidance indicia 224 in a progressing and ongoing manner as characteristics, such as the agricultural output characteristic 110, second vehicle characteristic or the like occur and are observed.

In an example, the companion guidance line 222, generated by the companion guidance controller 120, is received by a control interface 140 (See FIG. 2) associated with at least one of the second vehicle 204 or the second implement 208. The control interface 140 implements the companion guidance line 222 to autonomously guide the second vehicle 204 and its second implement 208 to conduct the second agricultural operation. In an example, the companion guidance line 222 is an assembly of the companion guidance indicia 224, for instance assembled with the indicia assembler 132 (see FIG. 2). In another example, the companion guidance line 222 includes a line extending along the companion guidance line indicia 224, curve fit to the companion guidance line indicia 224 (e.g., with one or more curve fitting functions or algorithms) or the like. In these examples, the companion guidance line 222 may track with the indicia, follow a substantially same contour, or, in some examples deviate according to the function or algorithm used for curve fitting. In an example, the control interface communicates the companion guidance line 222 to at least one of the second vehicle 204 or the second implement 208 for implementation with autonomous operation, semi-autonomous operation or to provide guidance cues to an operator.

Figures 4A, 4B, 4C:
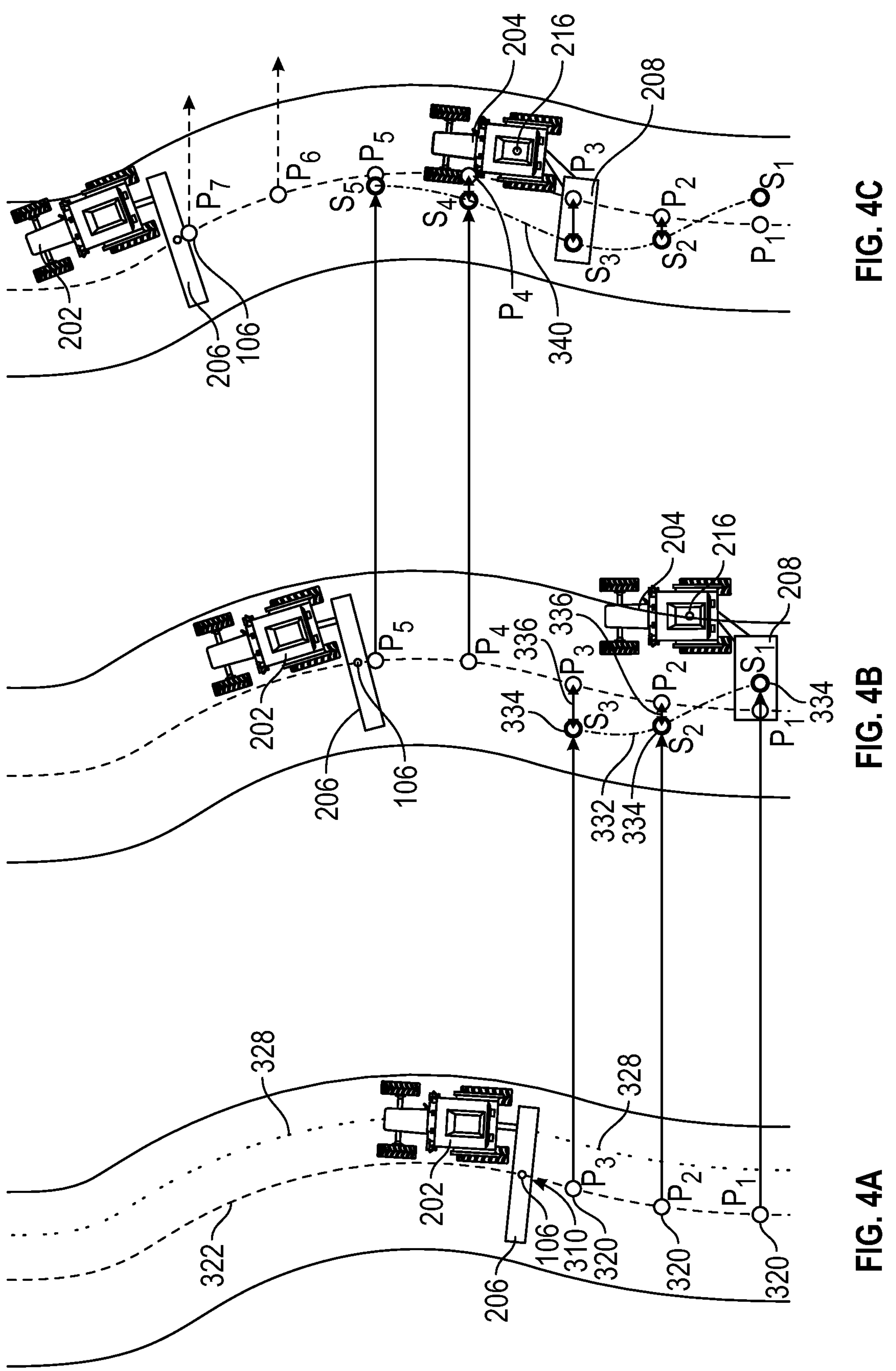
FIGS. 4A-C are progressive plan views of another example of cooperative agricultural vehicle operation including contemporary generation of guidance line indicia.

In an example, the baler (as the second implement 208) coupled with a tractor (as the second vehicle 204) bales cut crop from the first implement 206 at locations corresponding to the companion guidance line indicia 224 generated with the companion guidance controller 120. In some arrangements the second vehicle 204 and the second implement 208 are not aligned. For instance, the second implement 208 is in a laterally offset position relative to the second vehicle 204. An example of this orientation is shown in FIGS. 4A-C, and is an example of a second vehicle characteristic (e.g., a potential input to the companion guidance line generator 130). In this example, the companion guidance indicia 224 are refined to account for the variation in orientation. For instance, the input of the locations of the cut crop compiled with characteristics of the baler (such as its lateral offset from the tractor), refines the companion guidance indica 224 to guide the tractor in a manner that positions the baler (its intake) on the cut crop through the use of, for example, the association module 134. Accordingly, the tractor is guided along an offset path (e.g., the refined companion guidance line indicia 224) while the baler (the second implement 208) tracks with the cut crop.

FIGS. 4A-4C illustrate an example arrangement including a first agricultural vehicle 202, such as the tractor discussed in FIG. 3, with a first implement 206, such as a mower coupled to the tractor. The first implement 206, similar to the implement in FIG. 3, has a first sensor 106. The first sensor 106 relays information like that discussed in relation to FIG. 2 or FIG. 3 to the companion guidance controller 120 (see FIG. 2). In an example, the first sensor 106 monitors and relays information including, but not limited to location of the mower (e.g., the first implement 206) or the location of cut and deposited crop, each of these an example of the agricultural output characteristic 110 (in FIG. 2) and the agricultural output position 220 (in FIG. 3).

The tractor as the example second vehicle 204 and the baler as the example second implement 208 are associated with the companion guidance controller 120 (see FIG. 2). In the present example, the companion guidance controller 120 receives data corresponding to the cut and deposited crop as the first agricultural output characteristic 110 (alternatively the position of the implement, such as the mower outlet). The companion guidance controller 120 processes the agricultural output characteristic 110 (e.g., the position received from the first sensor 106, time of first agricultural operation or the like) and optionally any second vehicle characteristic inputs 126 such as static or dynamic inputs to generate companion guidance line indicia.

The companion guidance controller 120 generates guidance line indicia to facilitate the cooperative operation of the second vehicle 204 and the second implement 208 (e.g., in relation to the first vehicle and its implement, cut crop or the like). As discussed herein, the guidance line indicia are based on the preceding agricultural output characteristics of the first agricultural vehicle 202, first implement 206 or the like. The agricultural output characteristic 322 shown in FIG. 4A corresponds to a position of the mower, collectively a path taken by the mower (e.g., the first agricultural implement 206) and not necessarily to the first agricultural vehicle 202. As illustrated in the example shown in FIG. 4A, the agricultural output characteristic 322 is not the same as a first path 328 taken by the first agricultural vehicle 202. The agricultural output characteristic 322, in an example varies from the first path 328 based on one or more characteristics including a set offset between the first agricultural vehicle 202 and the first implement 206 (e.g., based on implement and hitch dimensions), varies dynamically, for instance with the first implement 206 movable relative to the first implement 206 (e.g., with an articulating mount, hitch or the like). The companion guidance controller 120 accounts for this variation when generating the companion guidance indicia, for example by receiving agricultural output characteristics monitored with the implement position sensor coupled with the implement, configured to observe deposited crop or the like. In another example, the implement position sensor 106 is mounted on the first agricultural vehicle 202 and its output is refined based on kinematic characteristics between the first agricultural vehicle 202 and the first implement 206 (e.g., spacing, orientation, dimensions or the like).

In FIG. 4A, the first sensor 106 on the first implement 206 (e.g., a mower) indexes (logs or records) the agricultural output positions 320. Each agricultural output position $P_1$, $P_2$, $P_3$ . . . $P_x$ corresponds to, for example, a location, coordinates, or the like (potentially indexed with a time value) the implement has passed, crop has been deposited in the field or the like (e.g., collectively an agricultural output characteristic 322). As the mower progresses through a field, the first sensor 106 records the agricultural output positions 320 and, optionally, the time the agricultural output occurred, as an example of a first agricultural output characteristic 322 (110 in FIG. 2). The agricultural output characteristic 322 based on the agricultural output positions 320 is relayed to the companion guidance controller 120 associated with one or more of the second vehicle 204 and the second implement 208 for generation of the companion guidance line indicia (shown in FIGS. 4B and 4C).

As agricultural output positions 320 are generated with the first agricultural vehicle 202 and first implement 206 the agricultural output positions 320 are relayed as the agricultural output characteristic 322 to the companion guidance controller 120 with the agricultural output characteristic input 124. Optionally one or more second vehicle characteristics are provided through the second vehicle characteristic input 126 of FIG. 2. The second vehicle characteristics include one or more of dimensions, position (x, y, z coordinates; RTK coordinates, GPS coordinates, yaw, pitch or roll or similar), operating angles or the like (e.g., kinematics) of one or more of the second vehicle 204 or the second implement 208. For instance, the second vehicle 204 includes a tractor and is coupled with a second implement 208, such as a baler. In the example illustrated in FIG. 4B, the second implement 208 is offset from the second vehicle 204. Additionally, the second implement 208 varies with regard to its dimensions, position or the like in comparison to the first implement 206 (a mower in this example). These variations in kinematics, dimensions or the like are conveyed to the companion guidance controller 120 as optional components of the agricultural output characteristic 110 (322 in FIG. 4A), second vehicle characteristics (shown schematically with dimensions, orientations and the like of the second implement 208 and the second vehicle 204) and received at the inputs 124, 126. As discussed herein the agricultural output characteristics and optionally the second vehicle characteristics are provided to the companion guidance controller 120 for generation of companion guidance line indicia that permit guidance of the second vehicle 204 and the second implement 208 in a manner that closely tracks with the agricultural output of the first implement 206. In this example, to align the second implement 208 (a baler) with the agricultural output (e.g., mowed grass) dimensions of the baler, its orientation, offset or the like relative to the second vehicle 204 are input as second vehicle characteristics to refine generated companion guidance indicia to account for the offset position of the baler relative to the second vehicle 204. The refined companion guidance indicia are implemented with an autonomous controller, guidance indicator system (e.g., haptic or visual feedback for a user), such as the control interface 140 in FIG. 2, to guide driving of the second vehicle 204 to align the baler with the agricultural output, such as the mowed grass.

Further still, in another example a second vehicle characteristic of the second implement 208 includes a conditional characteristic of the implement. For instance, the second implement 208 has one or more second vehicle characteristics, like bale volume, mass or fullness within a baler that guide (and potentially vary) generation of the guidance line indicia relative to the input agricultural characteristics. As shown between FIGS. 4B and 4C the second implement 208 has a variable lateral position relative to the companion guidance indicia to move the second implement 208 (e.g., a baler intake) to ensure cut grass is received in a portion of the baler that is not already full. The companion guidance line generator 130, in an example, receives the agricultural output characteristic through the input 124 and the second vehicle characteristic through the input 126 and compiles the data associated with each. The companion guidance line generator 130 generates companion guidance line indicia 334 for the second implement 208 in FIG. 4B that accounts for characteristics as noted herein (e.g., kinematics, such as implement and vehicle offsets, orientation, changes in position orientation or the like and optionally conditional characteristics of the implement such as bale volume, mass or fullness). In an example, each companion guidance line indicia $S_1$, $S_2$, $S_3$ . . . $S_x$ corresponds to a respective agricultural output position $P_1$, $P_2$, $P_3$ . . . $P_x$. In an example, the baler conducts its agricultural operation at a position offset (a distance of millimeters, centimeters, meters or the like) from each of the corresponding agricultural output positions. The offset 336 shown in FIG. 4B illustrates the variation between the agricultural output position $P_1$, $P_2$, $P_3$ . . . $P_x$ (of the first vehicle 202 and first implement 206) and a corresponding companion guidance line indicia 334 for the second implement 208 to ensure the second implement 208 readily receives the cut crop to generate a fully formed bail.

In another example, the offset 336 is the same, including substantially the same (e.g., a difference of millimeters or centimeters) distance between each companion guidance line indicia $S_1$, $S_2$, $S_3$ . . . $S_x$ and the respective agricultural output positions $P_1$, $P_2$, $P_3$ . . . $P_x$. In another example, the offset 336 varies between each companion guidance line indicia $S_1$, $S_2$, $S_3$ . . . $S_x$ and the respective agricultural output positions $P_1$, $P_2$, $P_3$ . . . $P_x$ (as shown in FIGS. 4B and 4C) For example, the distance between $P_1$ and $S_1$ is greater than or less than the distance between $P_2$ and $S_2$ and the distance between $P_3$ and $S_3$ is greater than or less than the distance between $P_1$ and $S_1$ and the distance between $P_2$ and $S_2$ (it is also contemplated the distances could be the same at specific locations and different at others).

As illustrated in the example shown in FIG. 4C, the companion guidance line generator 130 compiles the offset 336 data with the companion guidance line indicia 334, via the indicia assembler 132 and the association module 134 to generate the companion guidance line 340. The companion guidance line 340, in an example, provides data to form a path for the second implement 208 to follow to complete the second agricultural operation. In the example, the baler follows the companion guidance line 340 while the second vehicle 204 pulling the baler proceeds along a different path. Optionally, the companion guidance line 340 is further refined to account for the offset between the baler (the second implement 208) and the tractor (vehicle 204). For instance, the offset between the implement 208 and the vehicle 204 is a characteristic provided with the second vehicle characteristics in FIG. 2, and the companion guidance line 340 is accordingly refined based on the offset to provide an updated guidance line for the second vehicle 204. As the second vehicle 204 is driven along the updated guidance line the second implement 208 is accordingly positioned along and tracks along the companion guidance line 340 shown in FIG. 4C.

Figure 5:
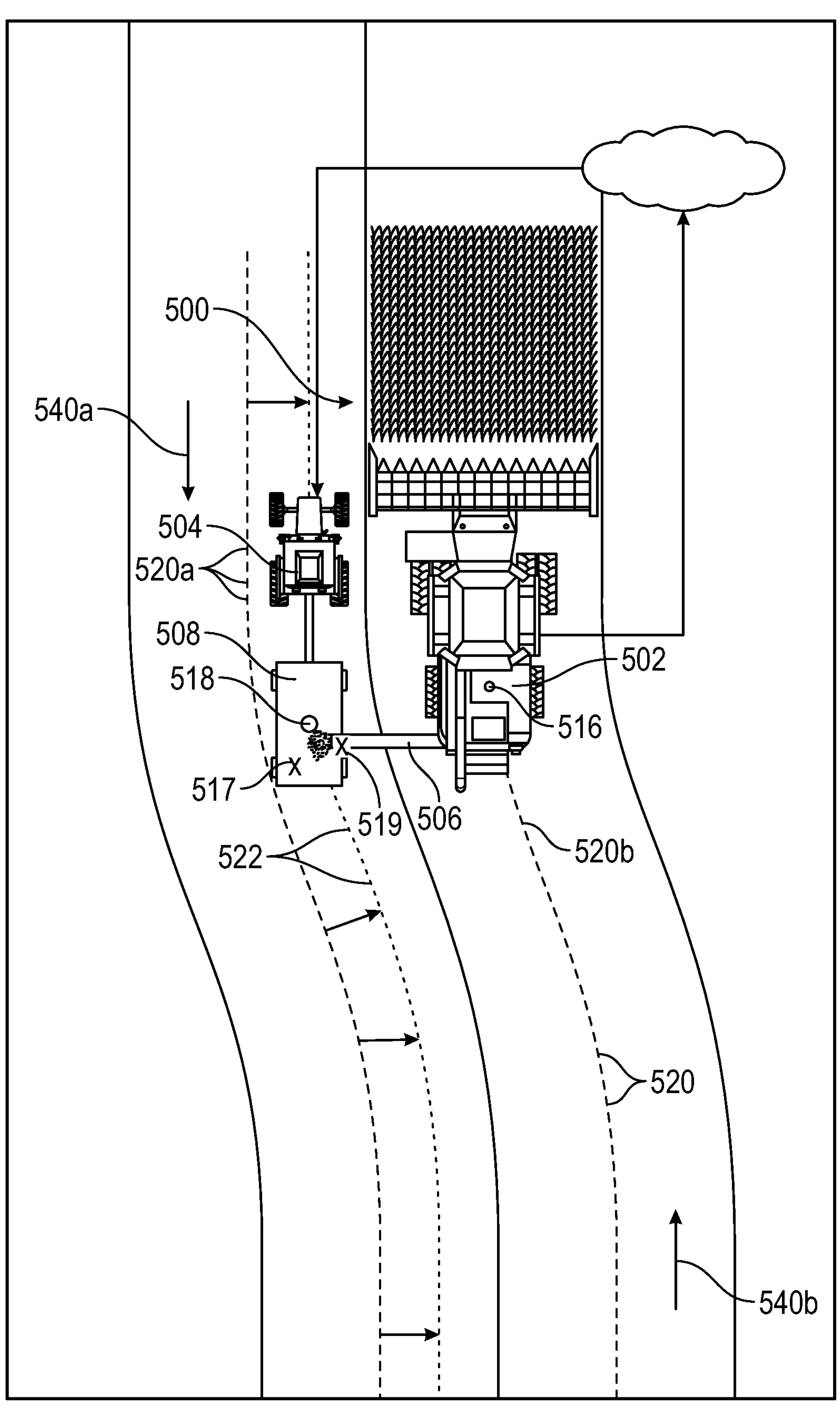
FIG. 5 is a plan view of an additional example of cooperative agricultural vehicle operation including a leading companion vehicle.

FIG. 5 illustrates another example of an agricultural system 500 with a first vehicle 502 having a first implement 506 and a second vehicle 504 having a second implement 508. In the example illustrated in FIG. 5, the first vehicle 502 operates contemporaneously with the second vehicle 504. For instance, the first vehicle 502 is a combine having a first implement 506 such as an unloader (e.g., side pipe, elevator, conveyor, auger, grain spout) and the second vehicle 504 is a tractor with a second implement 508 such as a grain cart. In the example illustrated in FIG. 5, during operation the unloader aligns with the grain tank of the grain cart during operation to offload grain. In an example of the grain cart operating alongside a combine, the second vehicle 504 coupled to the grain cart is, optionally, positionally ahead of the combine.

As illustrated in FIG. 5, the first vehicle 502 has a first sensor 516. The first sensor 516 is, for example, a position sensor that indexes the position of the first implement 506 (e.g. the position corresponding to a location of the sensor on the implement or an offset position relative to the sensor representing a component of the sensor), or the output crop (e.g. deposited crop from an auger or grain spout, or the like); each are examples of an agricultural output characteristic 110 (see FIG. 2). In an example, the first sensor 516 is coupled with the first vehicle 502 at a position either corresponding to the first implement 506 or displaced from the first implement 506. In an example where the first sensor 516 is on the first vehicle 502 but displaced from the first implement 506, the first sensor 516 has a specified offset that facilitates indexing of the location of the first sensor 516 as the location of the first implement 506 or the output. The offset, in one example is static (e.g., for a statically mounted first implement 506 or portion of the implement). In another example, the offset is dynamic and corresponds to a first implement 506 or portion thereof that moves relative to the first sensor 516.

The first sensor 516, in the example of the combine, indexes an agricultural output location or position as the agricultural output characteristic 520 such as the output of grain processed by the combine and the position of the combine. For example, when the combine is located on an uneven surface (e.g., hill) the agricultural output characteristic 520 accounts for the differing in position of the first vehicle 502 relative to the first implement 506. As shown in FIGS. 2, the agricultural output characteristic 520 is an example of the agricultural output characteristic 110 transmitted from the first sensor 516 to the companion guidance controller 120 associated with the second vehicle 504. For example, the companion guidance controller 120 receives the agricultural output characteristic 110 as an input. In an example, the agricultural output characteristics are received at the input 124 and compiled with the second vehicle characteristics inputs 126. For instance, at least the agricultural output characteristics 520 and, optionally, the second vehicle characteristics are received by the companion guidance controller 120 in a recursive manner (e.g., as progressing positions, vectors, or the like generated during operation of one or more of the first vehicle 502, the second vehicle 504, their implements, combinations of the same or the like)

for generation of a progressing companion guidance indicia 522 (e.g., shown as a line in FIG. 5) for the second vehicle 504.

In an example, the second vehicle 504 or the second implement 508 conducts a second agricultural operation that is a cooperative operation with the first agricultural operation, such as reception of harvested crop or the like from the first vehicle 502. As illustrated in FIG. 5, the second implement 508 is a grain cart operating in cooperation with the first implement 506, such as the unloader of the combine. In such an example, the grain cart (including a portion thereof, such as one or more zones of the grain cart) is aligned with the first implement 506 such as the unloader on the combine. The second implement 508, in an example, has one or more of a position sensor, optical sensor or the like (collectively the second sensor 518) to assist in aligning the second implement 508 with the first implement 506. For example, the second sensor 518 indexes the position of one or more of the second implement 508 or the second vehicle 504 relative to the companion guidance indicia 522 generated by the companion guidance controller 120 (e.g., as shown in FIG. 2) from the data received from the first sensor 516.

In another example, the second vehicle 504 has an optical sensor alone or in combination with a position sensor. The second vehicle 504 optionally has one or more computer vision fiducial markers 517 or another objected that is sensed by the first sensor 516 when the fiducial marker 517 is in the sensor's 516 field of view. Upon observing the fiducial marker 517 the companion guidance controller 120 (as discussed in FIG. 2) can ascertain position of the second implement 508 relative to the fiducial markers 517 (and accordingly the first vehicle 502 or the first implement 506). In an example, the first vehicle 502 has one or more fiducial markers 519 that is received by a second sensor 518 (as an optical sensor) on the second vehicle 504. Indicia corresponding to the first vehicle fiducial marker 519 is optionally compiled with output data from the first vehicle 502 to indicate an agricultural output characteristic 110 (as discussed in FIG. 2). In another example, if two more fiducial markers 517 are included the first sensor 516 observes each of the two or more fiducial markers 517. For instance, depending on the observed orientation to each other (and geometry-based analysis) the companion guidance controller 120 determines the position of the second implement 508 relative to the first vehicle 502 or the first implement 506.

In another example, the second sensor 518 monitors the filling of the grain cart (an example of a second vehicle characteristic inputs 126), and the companion guidance controller 120 indexes or records filling of the grain cart to assist in providing information to refine generation of the companion guidance line indicia 522. For instance, positioning of the second implement 508 (the grain cart) relative to the companion guidance indicia 522 and the first implement 506 (the unloader) causes the grain cart to move to a position for filling of less filled portions of the grain cart. The second sensor 518 (as a positional sensor) optionally uses the second sensor (as an optical sensor) observations to deviate from the indicia from the agricultural output characteristics 110 to fill up the less full portion. The observations from the second sensor, in an example, are used to adjust or change the second implement 508 (the unloader) position.

In operation, the system of vehicles and implements shown in FIG. 5 receives the agricultural output characteristic 110 of the first vehicle 502 to generate the guidance line indicia 522. In this example, the agricultural output characteristics 110 of at least a previous pass (e.g., swath) of the first vehicle 502 is used to generate companion guidance line indicia for the second vehicle 504 and its implement 508 as it cooperatively works with the first vehicle 502 and shadows the first vehicle 502 on its current pass.

In the example illustrated in FIG. 5, the first vehicle 502, such as the combine, has conducted a previous pass **540*a* (also referred to as a first pass) and a progression of agricultural outputs 520*a* are shown corresponding to indexed positions the agricultural output characteristic (e.g., the implement position such as an unloader, previous vehicle position or the like). In an example, the first sensor 516, such as a GPS, RTK sensor or the like, monitors the agricultural output characteristics 520 and provides the characteristics to the companion guidance line generator 130 as previously discussed herein. A corresponding guidance line indicia 522 is generated with the companion guidance line generator as previously discussed and shown in FIG. 2**.

For example, the first vehicle 502 conducts several passes in a field such as proximate passes, one or more preceding passes, and is in the process of conducting a present pass. As the first vehicle 502 conducts these passes agricultural outputs **520*a*, 520*b* (examples of agricultural output characteristics) corresponding to the progressing position of the first vehicle, its implement, crop output or the like while conducting the passes are relayed and compiled by the companion guidance line generator 130 (as discussed previously) for generation of the guidance line indicia 522. In the example shown in FIG. 5, the first vehicle 502 conducts the first agricultural operation (harvesting) in each of the preceding or proximate (first) pass 540*a* and in the present (or second) pass 540*b* and the first and second agricultural outputs 520*a*, 520*b* as examples of the agricultural output characteristics are relayed to the companion guidance line generator 130**.

In other examples, the agricultural output **520*b* (an example agricultural output characteristic) is optionally an input for control of a 'vertical' position of the second implement 508 relative to the first implement 506. As shown in FIG. 5 because the first and second vehicles 502, 504 operate adjacent to each other (e.g., side by side, and potentially with the second vehicle leading the first vehicle) the vertical position of the second implement 508 relative to the first implement 506 is an input of the companion guidance line indicia 522 to ensure receipt of crops from the first implement to the second implement (and conversely minimizing spilling of crops to the field). In various examples, the companion guidance line indicia 522 include (in addition to positional indicia) speed indicia to control the speed of the second vehicle 504 and thereby provide the specified 'vertical' control of the second implement 508 relative to the first implement 506. In an example, the speed indicia component of the companion guidance line indicia 522 corresponds to a deviation between position sensors (e.g., first and second sensors 516, 518 such as GPS sensors). The deviation between the sensors is decreased with feedback control implemented through one or more of throttle or break control of the second vehicle 504. In another example, the speed indicia component of the guidance line indicia 522 includes one or more speed values as part of the guidance line indicia 522 that, when implemented with the second vehicle 504, decrease a positional deviation such as the deviation between first and second sensor 516, 518** positions.

The companion guidance line generator 130 generates companion guidance line indicia 522 based on at least the agricultural outputs **520*a* of the preceding pass 540*a* of the first vehicle 502. The second vehicle 504 uses the guidance line indicia 522 (based on the position of the agricultural output 520***a*) for guidance when shadowing or following the first vehicle 502 conducting the first agricultural operation (harvesting) in the second pass 540*b*. Because the first vehicle 502 follows a corresponding path in the second pass 540*b* as the first pass 540*a* (e.g., the harvester is following its previously harvested edge from the first pass 540*a*) the companion guidance line indicia 522 based on the previous first pass 540*a* provide guidance for the second vehicle 504 and its implement 508 to shadow the current operation of the first vehicle 502 while conducting the second pass 540*b*. The shadowing or following provided with the companion guidance line indicia 522 permits accurate lateral positioning of the second implement 508, a grain cart, relative to the first implement 506, such as an unloader including a grain spout, of the first vehicle 502.

In an example, the second pass 540*b* by the combine is similar to the first pass 540*a*. As shown, the second vehicle 504 is proximate to the first vehicle 502 and the second vehicle 504 follows the guidance line indicia 522 related to the second pass 540*b*. In the example above, the second vehicle 504 (a tractor with a grain cart) progresses along the second pass 540*b* ahead of the first vehicle 502 based on the kinematics (e.g., length) relationship of the first vehicle 502 relative to the second vehicle 504 or the position of the agricultural output of first implement 506 or the like. In an example, the companion guidance line indicia 522 are predictive in nature for the agricultural operation of the grain cart. For instance, the tractor coupled with the grain cart following the guidance line generated by the companion guidance controller 120 progresses through a field in an advanced position from the combine. As shown in FIG. 5, the second vehicle 504 leads the first vehicle 502 to align the second implement 508 (the grain cart) with the agricultural output characteristic, in this example a grain spout of an unloader. In an example, the second vehicle 504 proactively steers proximate to a second pass 540*b* (e.g., adjacent or next to the second pass) based on the preceding agricultural output 520*a* and the associated companion guidance line indicia 522 without 'following' the first vehicle 502. Instead, the second vehicle 504 is guided along the guidance indicia based on the first vehicle 502 previous pass 540*a* to facilitate shadowing of the similar path of the first vehicle 502 while the first vehicle conducts the present second pass 540*b* (relative to the previous pass 540*a*).

Figure 6:
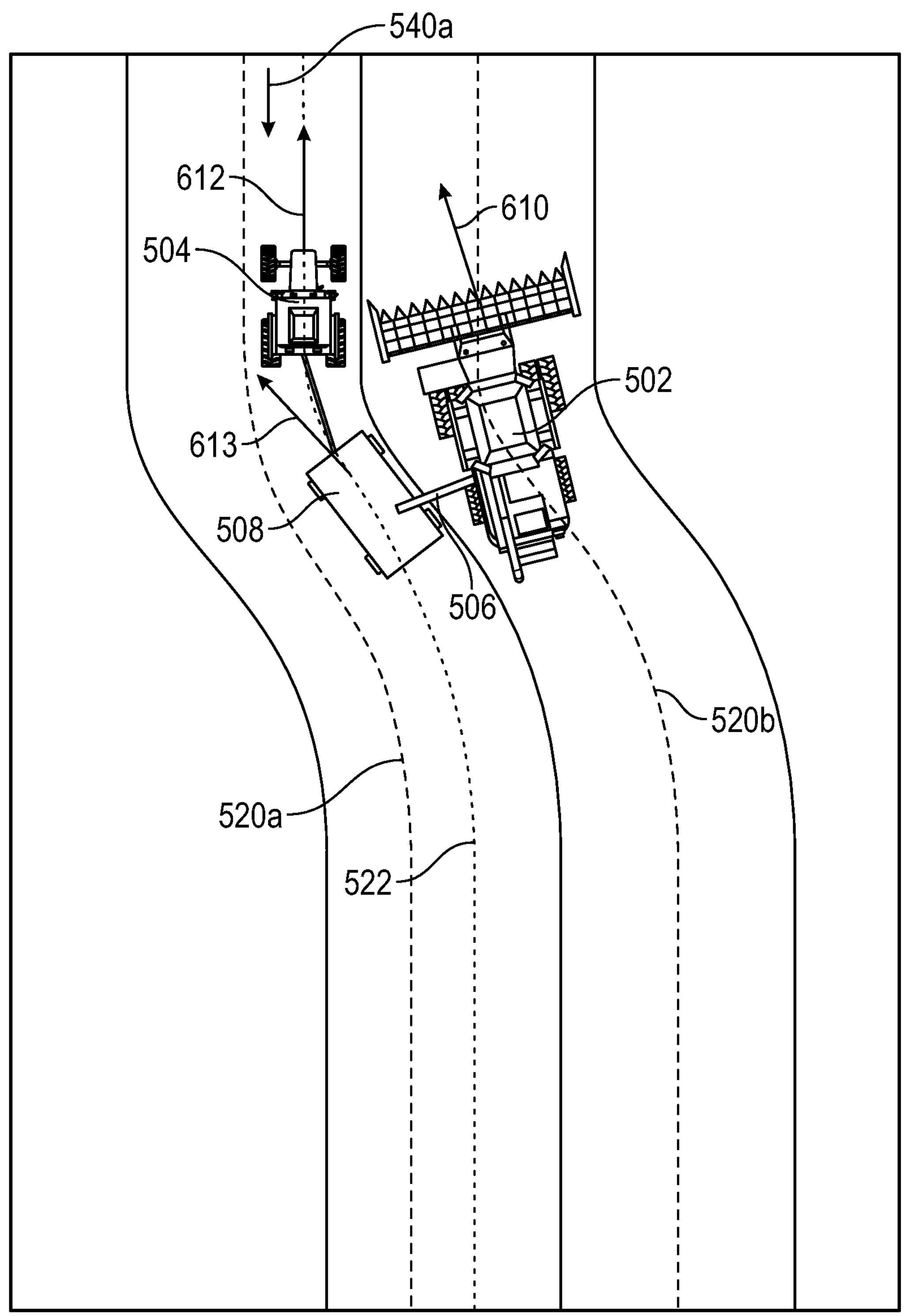
FIG. 6 is a detailed plan view of the cooperative vehicle operation of FIG. 5 while conducting turns with the vehicles.

FIG. 6 illustrates an example of the first vehicle 502 with the first implement 506 and the second vehicle 504 with the second implement 508 that implements guidance with the agricultural system 100 discussed in FIG. 2. As previously discussed, the first vehicle 502 is a combine with an unloader as the first implement 506 and the second vehicle 504 is a tractor with a grain cart as the second implement 508. While FIG. 6 illustrates a combine and grain cart example of cooperative agricultural operations, in other examples, the first and second vehicles 502, 504 and their associated implements 506, 508 vary and may include, but are not limited to, tractors, combines, agricultural vehicles, tillers, planters, cultivators, sprayers, spreaders, harvester heads or the like.

As illustrated in FIG. 6, the second vehicle 504 (the tractor) is in an advanced or lead position relative to the position of the first vehicle 502 (the combine) to permit alignment of the second implement 508 (the grain cart) with the first implement 506 (the unloader). The second vehicle 504 travels through the field on different headings 612 (vectors, directions, routes, courses, paths, or the like) relative to the heading 610 of the first vehicle 502 while the second vehicle 504 is also in a leading position relative to the position of the first vehicle 502. Depending on turns, curving or the like of guidance indicia 522, and in part because of the leading position of the second vehicle 504, the second vehicle 504 moves along different headings (e.g., with different vertical and lateral components of movement) that may frustrate alignment of second implement 508 and the first implement 506. As described herein the companion guidance controller 120 including the companion guidance line generator 130 is readily able to guide the second vehicle 504 with the guidance indicia 522 in a manner that keeps the second implement 508 aligned with the first implement for conduct of their agricultural operations cooperatively.

One example of the potential variation in headings caused in part by the different vertical position of the second vehicle 504 (including variations in lead position, potentially including trailing positions with some turns), curvature of guidance indicia and the related potential misalignment of the implements 506, 508 is shown in FIG. 6. During operation, the second vehicle 504 is, potentially vertically positioned ahead of the first vehicle 502. While navigating turns, curves or the like the vertical position of the second vehicle 504 changes relative to the first vehicle 502, and in some examples may even trail the first vehicle 502 in tight turns (e.g., 90 degree, 180 degree turns or the like). Similarly, as the vertical position differs between the vehicles 502, 504 each arrives at, exits and conducts turning at different times, spans of time, lengths of turns or the like. Turning, vertical position variations and the like causes changes in headings 610, 612 and the different headings vary lateral and vertical components of movement for each of the vehicles 502, 504 relative to each other. For instance, as shown in FIG. 6, the second vehicle 504 travels through the field with the heading 612 that is different in comparison to the heading 610 of the first vehicle 502 (e.g., a vertically northern heading 612 relative to a northwestern heading 610). In an example, the tractor pulling the grain cart is vertically positioned ahead of the combine, and the combine conducting the turn with the northwestern heading 610 has a corresponding decreased vertical component and increased lateral component of movement (relative to the second vehicle 504 or tractor) that further increases the vertical position of the tractor relative to the combine.

In another example, the second implement 508 is coupled to the second vehicle 504 with a movable (translatable, rotational or the like) coupling, such as an articulating hitch. In this example the second implement 508 coupled with the movable coupling, optionally, has a third heading 613 (vector, direction, route, course, path or the like) that is varied relative to the headings 610, 612. As in the example above, the tractor has completed a turn and the combine is entering the turn. However, the grain cart is finishing the turn and has the different heading 613 (north-west) from each of the headings 610, 612 and accordingly has its own differing vertical and lateral movements relative to the first and second vehicles 502, 504. In this example, each of the headings 610, 612, 613 are different because of the kinematics of the vehicles, implements or the like (e.g., their vertical positions, joints or the like, turning radii, wheel bases or the like) and the different navigation of curves (time of entry, time of exit, turning radius, turn length). Accordingly, guidance of the second vehicle 504 and its second implement 508 is in some examples difficult to conduct in a manner that maintains alignment between the second implement 508 and the first implement 506 of the first vehicle 502 to permit cooperative conduct of their respective agricultural operations.

As further shown in FIG. 6, the second vehicle 504 travels through a field with a predictive guidance line composed of guidance indicia 522 generated from the companion guidance controller 120 (see FIG. 2) based on the previous pass 540*a* of the first vehicle 502 (the combine) and the indexed agricultural output characteristic 520*a* (e.g., the positions of the first vehicle 502, first implement 506, agricultural output of the first implement or the like). The generation of a predictive guidance line from the agricultural output characteristic from the previous pass 540*a* is isolated (at least initially) from variations in vertical position between the vehicles and implements, differences in conduct of turning or the like that in other examples frustrate cooperative operations having a second vehicle attempting to actively shadow a first vehicle as noted above. In this example, with the companion guidance controller 120 the companion guidance indicia 522 are predictively generated (extend ahead of the position second vehicle 504 as shown in FIGS. 5 and 6) and the second vehicle conducts driving along the companion guidance indicia 522 instead of actively attempting to shadow or follow the movement of the first vehicle 502.

The guidance of the second vehicle 504 is controlled (e.g., with changes in speed along the companion guidance indicia 522) to align the second implement 508, the grain cart, with the first implement 506, such as a grain spout of a grain auger. With the position sensors discussed herein, the location of the first and second implements 506, 508 are monitored in an ongoing manner. Deviations between the implement positions normally indicative of missing or spilling of grain from the auger spout to the ground instead of to the grain cart are addressed by changing the speed of the first vehicle 504 to decrease position deviation. The second vehicle 504 maintains guidance along the predictive companion guidance indicia 522 while the second vehicle 504 speed is changed in order to actively align the second implement 508 (the grain cart) with the first implement 506, in this example a grain spout. In an example, the second vehicle 504 is sped up or slowed down along its companion guidance indicia 522 to position its second implement 508 in alignment to the first implement 506. With generation of the predictive companion guidance indicia 522 and refining conduct of driving along the indicia 522 the first and second implements 506, 508 are readily aligned.

In one example, the agricultural output 520*a* of the first vehicle 502 from its preceding pass 540*a* facilitates predictive guidance of the second vehicle 504 along the generated guidance line indicia 522 to lead the first vehicle 502. In such an example, the companion guidance line generated by the companion guidance controller 120 (as described related to FIG. 2) compiles data from the agricultural output 520*a* of the preceding pass 540*a* of the first vehicle 502 to generate the guidance line indicia 522. Optionally, the present position or the observed output received from the first sensor 516 of the first vehicle 502 (e.g., its contemporaneously agricultural output 520*b*) is an agricultural output characteristic 110 to the companion guidance controller 120 that controls the position of the second vehicle 504 and the second implement 508. In an example, the received input of the agricultural output characteristic 124 is compiled with the second vehicle characteristic inputs 126, such as location of the second implement 508, to assist in guiding movement of the second implement 508 to a position proximate to the first implement 506 (e.g., aligned to permit offloading of crops from the first vehicle 502 to the grain cart of the second vehicle 504). For instance, at least one or more of the positions or dimensions of the second vehicle 504 or the second implement 508 are included with the positions or dimensions of the first vehicle 502 or its first implement 506 to generate a guidance line 150 (see FIG. 2) comprised of the indicia 522 that is transmitted to a control interface 140 of the second vehicle 504 to guide the second vehicle 504 and the second implement 508 along the indicia 522, and at the same time also aligns the second implement 508 with the first implement 506 to permit the cooperative agricultural operation (e.g., offloading of crops).

Accordingly, variations in heading, changes in vertical position between vehicles because of differences in kinematics, the conduct of turns or the like that frustrate alignment of implements with other systems that attempt to shadow (e.g., actively follow the movements of a first or lead vehicle) are overcome through the generation of companion guidance indicia and control of the second vehicle 504 (e.g., speed) along the indicia to cooperatively use implements. The companion guidance controller 120 described herein addresses potential differing headings by using, for example, the preceding agricultural output 520*a* of a preceding pass 540*a* of the first vehicle 502 to generate corresponding companion guidance line indicia 522 (e.g., of a companion guidance line) that predictively guide the second vehicle 504 and its second implement 508 in a cooperative manner to the present operation of the first vehicle 502 (e.g., in an adjacent or current pass 540*b* of the first vehicle 502). The predictive guidance line 520*a* permits the second vehicle 504 to proceed in a vertical position relative to the first vehicle 502 while still cooperatively positioning its second implement 508 with the first implement 506. For instance, as shown in FIG. 6, the second vehicle 504 preemptively conducts turns and other guidance, varies its heading relative to first vehicle 502, maintains a vertical position (leading in this example) relative to the first vehicle 502 all while positioning the second implement 508 for cooperative operation with the first implement 506.

Figure 7:
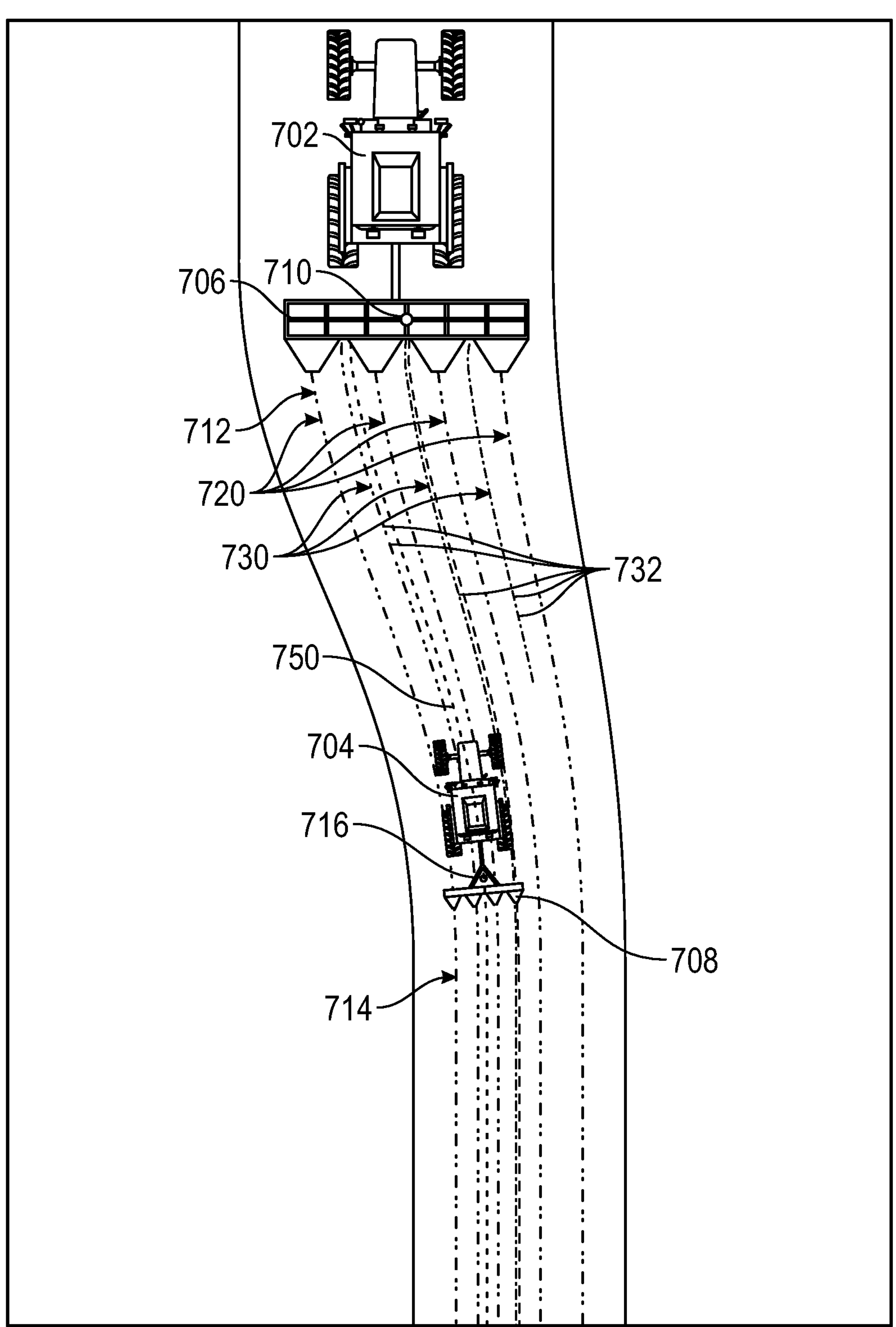
FIG. 7 is a plan view a supplemental example of cooperative agricultural vehicle operation including soil preparation and accurate planting to the prepared soil.

FIG. 7 illustrates an example of another system that uses a previous pass to assemble a guidance line comprised of guidance indicia for at least one second vehicle and implement. As illustrated in FIG. 7, the first vehicle 702 conducts a first agricultural operation 712 such as forming mounds or hills for precision planting of various crops (e.g., carrots, corn, potatoes, and the like), planting seeds, or the like. The second vehicle 704 having a second implement 708 performs a subsequent agricultural operation 714 including, but not limited to, planting (after mound building), spraying, harvesting, bailing, spreading, cultivating or the like. In this example, the first implement 706 includes at least a first sensor 710. The first sensor 710 includes one or more of a position sensor that monitors a location of at least one agricultural output characteristics 720 or an optical sensor that monitors profile or physical characteristics of the agricultural output characteristics 720 (e.g., shape or position of a mound). Optionally the first sensor 710 monitors both positional and observed characteristics as the agricultural output characteristic 720. In another example, a plurality of first sensors 710 are coupled to the first implement 706 to locate multiple agricultural output characteristics 720 (e.g., the positions, profiles or the like of multiple mounds, crop rows, furrows or the like). As previously discussed (with reference to FIG. 2 and other preceding Figures), the one or more agricultural output characteristics 720 are input to the companion guidance controller 120 (as shown in FIG. 2) and processed to generate a companion guidance line 750 used by one or more of the second vehicle 704 or its second implements 708 to guide positioning of the second implement 708 based on one or more agricultural output characteristics. In an example, the companion guidance controller 120 communicates the companion guidance line 750 to the second vehicle 704 and to the second implement 708 to provides gross control to assist in preventing overrunning of mounds and permits guidance of the second vehicle 704 along the mounds, while guidance of the second implement 708 permits precise planting or husbandry to the mounds. In another example, a driver may drive the second vehicle 704, and the indicia corresponding to the agricultural output characteristic 712 are used by the second implement 708 to position the second implement 708 during operation.

In an example, the first sensor 710 of the first implement 706 is a position sensor that monitors the location of the agricultural output characteristic 720 (such as the spaced mounds that are ready for planting). Optionally, the first sensor 710 is coupled with each tool of the first implement 706. As illustrated in FIG. 7, the first implement 706 is a hiller with a first sensor 710 coupled to each disc or individual hiller attachment. In an example, the first sensor 710 (including at least one first sensor of a plurality of first sensors) conducts ongoing monitoring of one or more of the agricultural output characteristic 720 or an observed profile of the agricultural output characteristic, or both. The output of ongoing monitoring is indexed in a similar ongoing manner (e.g., recursively), for instance with the companion guidance line generator 150, a dedicated processor (e.g., a GPS unit, RTK unit or the like). In an example, the output ongoing monitoring (e.g., the agricultural output characteristics) includes one or more additional characteristics such as an offset corresponding to the positions of tools (discs or the like on a hiller) that are part of the first implement 706, spacing relative to each other or the like. With one or more of first sensors 710 coupled to individual tools on the first implement, or with an offset accounted for in the agricultural output characteristic, the indexing of the agricultural output characteristics 720 is enhanced and permits enhanced generation of one or more of the guidance indicia.

As the first sensor 710 monitors the progressive position of the first implement 706 (including tools or components thereof) the corresponding agricultural output characteristic 720 (e.g., position, characteristics of the implement 706 or the like) is optionally provided to a storage system such as cloud-based storage system, a processor or the like. Agricultural output characteristics 720, such as one or more of position, profile characteristics or the like are optionally accumulated and stored, for instance with the cloud-based storage system, processor or the like for use as inputs when generating the guidance line indicia. In an example, the first sensor 710 recursively monitors the first agricultural output characteristics 720 and relays the characteristics to a cloud-based storage system, a processor for storing the characteristics for eventual relay to the companion guidance controller 120 (see FIG. 2). In another example, the companion guidance controller 120 receives the agricultural output characteristics 720 as the characteristics are observed with the sensor 710 (or sensors) and immediately uses the characteristics 720 for generation of the guidance line indicia. For example, the companion guidance controller 120 receives contemporaneous updated agricultural output characteristics 720 from the sensor 710 and generates indicia based on the updated agricultural output characteristic 720 (e.g., position of the first implement 706, one or more characteristics of the implement 706, characteristics of the agricultural output of the implement such as mounds or the like).

In an example, a first implement 706 coupled with the first vehicle 702 performs the first agricultural operation 712. The first agricultural operation 712 results in, for example, a plurality of agricultural output characteristics 720. In an example, the first implement 706 is a hiller and the resulting agricultural output characteristics 720 is a plurality of mounds having a specified spacing (distance between each mound, such as millimeters, centimeters, meters or the like) and profile (such as a dome profile of a specified height relative to ground or intervening furrow level). In an example, the first agricultural operation 712 and the first implement 706 are configured to space adjacent mounds (e.g., equally spaced or have a different spacing between adjacent mounds) as specified by the profile of the field, preferences of the operator, kinematics of the implement 706 or the like. The first sensor 710, in an example, monitors data corresponding one or more of the location of agricultural output characteristic 720, space (furrows) between the output such as mounds, the profile of the agricultural output characteristic 720 (shape, height, width) or the like.

In an example, an input of the agricultural output characteristics 720 is, for example, received by the companion guidance controller 120 (as discussed related to FIG. 2) in a recursive (e.g., ongoing, continuous, or the like) manner (e.g., as positions, vectors or the like generated during operation of the first vehicle 702, operation of the first and second vehicles 702, 704). The companion guidance controller 120 generates one or more companion guidance lines 730 comprised of indicia that are based, at least in part, on the input agricultural output characteristics 720. In an example, the companion guidance line 730 is generated from the agricultural output characteristic 720, such as position of the implement tools, the outputs from the various tools of the implement or the like, and one or more second vehicle characteristics (e.g., positions of planting row units, spacing between units, position of a vehicle or implement position sensor 716 relative to implement 708 tools or the second vehicle 704 or the like). In an example, the first implement position sensor 710 provides accurate position information of the first agricultural output characteristic 720, such as one or more mounds that are ready for a planting operation with the second implement 708. The companion guidance line generator 130 (as discussed in relation to FIG. 2) generates component indicia 732 (indicative of the guidance lines 730 in FIG. 7) to enhance accuracy in conduct of the second agricultural operations 714 (such as planting, spraying, harvesting, cultivating, baling or the like).

In one example, the companion guidance lines 730 and the associated companion guidance line indicia 732 are based on the agricultural output characteristic 720 and are plotted along the one or more first agricultural output characteristics 720 (such as specific mound locations). In the example of FIG. 7, plotting of indicia 732 accurately represents the mounds and facilitates guidance of at least one second vehicle 704, the second implement 708 and its planting row sections (e.g., discrete or independent lateral positioning) to conduct planting accurately along each of the rows (or mounds) having associated indicia 732.

Optionally, as shown in FIG. 7, multiple companion guidance indicia 732 and associated guidance lines 730 are generated to facilitate guidance of multiple second vehicles 704. As illustrated in FIG. 7, the companion guidance line indicia 732 and associated guidance lines 730 are provided in proximate rows. In an example, each of a plurality of associated second vehicles 704 has fewer second implement 708 tools (rows or row units) than the number of tools (rows or row units) on the first implement 706. For instance, first implement 706 (the hiller) forms a larger quantity of mounds than are planted by the tools of the second implement 708 (the planter). In this example, multiple planters (second vehicles and implements 704, 708) work side-by-side, are staggered or the like to plant along each of the mounds made by the larger first implement 706. In this example, each second vehicle 704 receives guidance indicia 732 corresponding to a specified portion of the agricultural output of the (larger) first implement 706. For example, each planter 708 performs its agricultural operation along a subset of companion guidance lines 730 according to the number of tools on the planter 708. If the planter (second implement 708) has fewer tools than the preceding hiller (first implement 706), a second planter (another second implement 708) operates in the mounds proximate to those planted by the first planter. In another example, a single planter (e.g., second implement 708) conducts multiple planting passes in comparison to the larger hiller (the first implement 706) and based on the companion guidance indicia 732 to plant along each of the mounds made by the hiller.

Various Notes and Aspects

Aspect 1 can include subject matter such as a control system configured for guiding at least a second vehicle of a vehicle team, the control system comprising: an agricultural output characteristic input configured to receive a progressing agricultural output characteristic of a first vehicle in an ongoing manner contemporaneous to the first vehicle performing an agricultural operation; a second vehicle characteristic input having one or more second vehicle characteristics; a companion guidance controller in communication with the agricultural output characteristic input and the second vehicle characteristic input, and configured for communication with the second vehicle, the companion guidance controller includes: a companion guidance line generator configured to recursively generate companion guidance line indicia based on the associated progressing agricultural output characteristic and the one or more second vehicle characteristics; and an indicia assembler configured to assemble a companion guidance line for the second vehicle including appending generated companion guidance line indicia with preceding companion guidance line indicia; and a control interface configured to communicate the companion guidance line to one or more of driving or implement operation elements of the second vehicle.

Aspect 2 can include, or can optionally be combined with the subject matter of Aspect 1, to optionally include wherein the progressing agricultural output characteristic of the first vehicle includes an updating position of a cut agricultural crop or an updating position of a first implement of the first vehicle.

Aspect 3 can include, or can optionally be combined with the subject matter of one or any combination of Aspects 1 or 2 to optionally include wherein the companion guidance line generator is configured to recursively generate companion guidance line indicia that align a second implement of the second vehicle with the updating position of the cut agricultural crop.

Aspect 4 can include, or can optionally be combined with the subject matter of one or any combination of Aspects 1-3 to optionally include wherein the companion guidance line generator is configured to generate the companion guidance line indicia contemporaneously to the first vehicle conducting the agricultural operation.

Aspect 5 can include, or can optionally be combined with the subject matter of one or any combination of Aspects 1-4 to optionally include wherein the one or more second vehicle characteristics include one or more of an implement offset, implement characteristic, second vehicle sensor input, row section count, row section spacing, or specified leading offset between the first and second vehicles.

Aspect 6 can include, or can optionally be combined with the subject matter of Aspects 1-5 to optionally include wherein the one or more second vehicle characteristics include one or more of static or dynamic second vehicle characteristics.

Aspect 7 can include, or can optionally be combined with the subject matter of Aspects 1-6 to optionally include a position sensor configured for coupling with a first implement of the first vehicle.

Aspect 8 can include, or can optionally be combined with the subject matter of Aspects 1-7 to optionally include wherein the companion guidance line generator configured to recursively generate companion guidance line indicia is configured to: generate the companion guidance line indicia for one or more discrete progressing agricultural output characteristics of the first vehicle and the one or more second vehicle characteristics; associate the companion guidance line indicia with the one or more discrete progressing agricultural output characteristics; and repeat the generation and association of the companion guidance line indicia with updated discrete progressing agricultural output characteristics.

Aspect 9 can include, or can optionally be combined with the subject matter of Aspects 1-8 to optionally include wherein the companion guidance controller is configured to guide the second vehicle along the companion guidance line and follow the first vehicle conducting the agricultural operation.

Aspect 10 can include, or can optionally be combined with the subject matter of Aspects 1-9 to optionally include wherein the companion guidance controller is configured to guide the second vehicle along the companion guidance line and conduct a cooperative agricultural operation to the agricultural operation of the first vehicle.

Aspect 11 can include, or can optionally be combined with the subject matter of Aspects 1-10 to optionally include wherein the companion guidance controller is configured to guide the second vehicle along the companion guidance line alongside the first vehicle conducting the agricultural operation.

Aspect 12 can include, or can optionally be combined with the subject matter of Aspects 1-11 to optionally include wherein the progressing agricultural output characteristic includes a previous swath of the first vehicle performing the agricultural operation.

Aspect 13 can include, or can optionally be combined with the subject matter of Aspects 1-12 to optionally include wherein the companion guidance line indicia include one or more of a plurality of guidance line points or guidance line segments.

Aspect 14 can include, or can optionally be combined with the subject matter of Aspects 1-13 to optionally include a control system configured for guiding at least a second vehicle of a vehicle team, the control system comprising: an agricultural output characteristic input configured to receive a discrete agricultural output characteristic of a first vehicle as the first vehicle performs an agricultural operation; a second vehicle characteristic input having one or more second vehicle characteristics; a companion guidance controller in communication with the agricultural output characteristic input and the second vehicle characteristic input, and configured for communication with the second vehicle, the companion guidance controller includes: a companion guidance line generator configured to generate a companion guidance line indicia based on the discrete agricultural output characteristic and the one or more second vehicle characteristics; an association module configured to index the companion guidance line indicia relative to the discrete agricultural output characteristic; and wherein the companion guidance controller is configured to repeat companion guidance line generation and indexing of the companion guidance line indicia upon receipt of an updated discrete agricultural output characteristic.

Aspect 15 can include, or can optionally be combined with the subject matter of Aspects 1-14 to optionally include wherein the discrete agricultural output characteristic includes a position of a of a cut agricultural crop or a position of a first implement of the first vehicle generated contemporaneously to the first vehicle conducting the agricultural operation.

Aspect 16 can include, or can optionally be combined with the subject matter of Aspects 1-15 to optionally include wherein the companion guidance line generator is configured to generate the companion guidance line indicia that align a second implement of the second vehicle with the position of the cut agricultural crop.

Aspect 17 can include, or can optionally be combined with the subject matter of Aspects 1-16 to optionally include wherein the companion guidance line generator is configured to generate the companion guidance line indicia contemporaneously to the first vehicle conducting the agricultural operation.

Aspect 18 can include, or can optionally be combined with the subject matter of Aspects 1-17 to optionally include wherein the one or more second vehicle characteristics include one or more of an implement offset, implement characteristic, second vehicle sensor input, row section count, row section spacing, or specified leading offset between the first and second vehicles.

Aspect 19 can include, or can optionally be combined with the subject matter of Aspects 1-18 to optionally include a position sensor configured for coupling with a first implement of the first vehicle.

Aspect 20 can include, or can optionally be combined with the subject matter of Aspects 1-19 to optionally include wherein the companion guidance controller is configured to guide the second vehicle along the companion guidance line and follow the first vehicle conducting the agricultural operation.

Aspect 21 can include, or can optionally be combined with the subject matter of Aspects 1-20 to optionally include wherein the companion guidance controller is configured to guide the second vehicle along the companion guidance line and conduct a cooperative agricultural operation to the agricultural operation of the first vehicle.

Aspect 22 can include, or can optionally be combined with the subject matter of Aspects 1-21 to optionally include wherein the companion guidance controller is configured to guide the second vehicle along the companion guidance line alongside the first vehicle conducting the agricultural operation.

Aspect 23 can include, or can optionally be combined with the subject matter of Aspects 1-22 to optionally include wherein the companion guidance line indicia include one or more of a plurality of guidance line points or guidance line segments.

Aspect 24 can include, or can optionally be combined with the subject matter of Aspects 1-23 to optionally include a method for guiding at least a second vehicle of a vehicle team, the method comprising: inputting a progressing agricultural output characteristic of a first vehicle in an ongoing manner, the progressing agricultural output characteristic corresponding to the conducting of an agricultural operation of the first vehicle; inputting a second vehicle characteristic input based on one or more second vehicle characteristics of the at least one second vehicle; and generating a companion guidance line of the at least one second vehicle, generating the companion guidance line includes: recursively generating companion guidance line indicia based on the input agricultural output characteristic; and assembling a companion guidance line including appending the generated companion guidance line indicia with preceding companion guidance line indicia.

Aspect 25 can include, or can optionally be combined with the subject matter of Aspects 1-24 to optionally include wherein the progressing agricultural output characteristic of the first vehicle includes an updating position of a cut agricultural crop or an updating position of a first implement of the first vehicle.

Aspect 26 can include, or can optionally be combined with the subject matter of Aspects 1-25 to optionally include wherein recursively generating the companion guidance line indicia includes recursively generating companion guidance line indicia that align a second implement of the second vehicle with the updating position of the cut agricultural crop.

Aspect 27 can include, or can optionally be combined with the subject matter of Aspects 1-26 to optionally include wherein the one or more second vehicle characteristics include one or more of static or dynamic second vehicle characteristics.

Aspect 28 can include, or can optionally be combined with the subject matter of Aspects 1-27 to optionally include wherein recursively generating the companion guidance line indicia includes: generating the companion guidance line indicia for one or more discrete progressing agricultural output characteristics of the first vehicle and the one or more second vehicle characteristics; associating the companion guidance line indicia with the one or more discrete progressing agricultural output characteristics; and repeating generation and association of the companion guidance line indicia with updated discrete progressing agricultural output characteristics.

Aspect 29 can include, or can optionally be combined with the subject matter of Aspects 1-28 to optionally include guiding the second vehicle along the companion guidance line and following the first vehicle conducting the agricultural operation.

Aspect 30 can include, or can optionally be combined with the subject matter of Aspects 1-29 to optionally include guiding the second vehicle along the companion guidance line and conducting a cooperative agricultural operation to the agricultural operation of the first vehicle.

Aspect 31 can include, or can optionally be combined with the subject matter of Aspects 1-30 to optionally include guiding the second vehicle along the companion guidance line alongside the first vehicle conducting the agricultural operation.

Aspect 32 can include, or can optionally be combined with the subject matter of Aspects 1-31 to optionally include wherein inputting the progressing agricultural output characteristic of the first vehicle includes inputting the progressing agricultural output characteristic as it is indexed by the first vehicle.

Aspect 33 can include, or can optionally be combined with the subject matter of Aspects 1-32 to optionally include wherein recursively generating the companion guidance line indicia includes recursively generating the companion guidance line indicia as the input progressing agricultural output characteristic is indexed by the first vehicle.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A control system configured for guiding at least a second vehicle of a vehicle team, the control system comprising:

one or more processors including:

an agricultural output characteristic input configured to receive one or more discrete progressing agricultural output characteristics inputs of one or more of a first vehicle and a first implement in an ongoing manner contemporaneous to one or more of the first vehicle and the first implement performing one or more agricultural operations;

wherein the agricultural output characteristic input receives the one or more discrete progressing agricultural output characteristics inputs of a first implement of the first vehicle from a position sensor coupled to the first implement of the first vehicle;

wherein the discrete progressing agricultural output characteristic includes a plurality of discrete output positions corresponding to one or more discrete indexed positions of the first implement of the first vehicle;

a second vehicle characteristic input having one or more second vehicle characteristics;

wherein the second vehicle characteristic input accounts for one or more conditional characteristics of a second vehicle implement of the second vehicle;

a companion guidance controller in communication with the agricultural output characteristic input and the second vehicle characteristic input, and configured for communication with the second vehicle, the companion guidance controller includes:

a companion guidance line generator configured to recursively generate companion guidance line indicia based on a plurality of the one or more discrete progressing agricultural output characteristics inputs and the one or more second vehicle characteristics;

wherein each companion guidance line indicia corresponds to an associated discrete progressing agricultural output characteristic input of the plurality of associated discrete progressing agricultural output characteristics inputs; and an indicia assembler configured to assemble a companion guidance line from each companion guidance line indicia for the second vehicle including appending generated companion guidance line indicia with preceding companion guidance line indicia; and a control interface configured to communicate the companion guidance line to one or more of driving or implement operation elements of the second vehicle.

2. The control system of claim 1, wherein the progressing agricultural output characteristic of the first vehicle includes an updating position of a cut agricultural crop or the updating position of a first implement of the first vehicle.

3. The control system of claim 2, wherein the companion guidance line generator is configured to recursively generate the companion guidance line indicia that align a second implement of the second vehicle with the updating position of the cut agricultural crop.

4. The control system of claim 1, wherein the companion guidance line generator is configured to generate the companion guidance line indicia contemporaneously to the first vehicle conducting the agricultural operation.

5. The control system of claim 1, wherein the one or more second vehicle characteristics include one or more of an implement offset, implement characteristic, second vehicle sensor input, row section count, row section spacing, or specified leading offset between the first and second vehicles.

6. The control system of claim 1, wherein the one or more second vehicle characteristics include one or more of static or dynamic second vehicle characteristics.

7. The control system of claim 1, wherein the companion guidance line generator configured to recursively generate companion guidance line indicia is configured to:

generate the companion guidance line indicia for one or more discrete progressing agricultural output characteristics of the first vehicle and the one or more second vehicle characteristics;

associate the companion guidance line indicia with the one or more discrete progressing agricultural output characteristics; and repeat the generation and association of the companion guidance line indicia with updated discrete progressing agricultural output characteristics.

8. The control system of claim 1, wherein the companion guidance controller is configured to guide the second vehicle along the companion guidance line and follow the first vehicle conducting the agricultural operation.

9. The control system of claim 1, wherein the companion guidance controller is configured to guide the second vehicle along the companion guidance line and conduct a cooperative agricultural operation to the agricultural operation of the first vehicle.

10. The control system of claim 1, wherein the companion guidance controller is configured to guide the second vehicle along the companion guidance line alongside the first vehicle conducting the agricultural operation.

11. The control system of claim 1, wherein the progressing agricultural output characteristic includes a previous swath of the first vehicle performing the agricultural operation.

12. The control system of claim 1, wherein the companion guidance line indicia include one or more of a plurality of guidance line points or guidance line segments.

13. A control system configured for guiding at least a second vehicle of a vehicle team, the control system comprising:

one or more processors including:

an agricultural output characteristic input configured to receive a progressing discrete agricultural output characteristic of a first vehicle as the first vehicle performs an agricultural operation;

wherein the agricultural output characteristic input receives a progressing discrete agricultural output characteristic input associated with a position of a first agricultural implement of the first vehicle from an agricultural output sensor coupled to the first implement;

a second vehicle characteristic input having one or more second vehicle characteristics;

wherein the second vehicle characteristic input accounts for one or more conditional characteristics of a second vehicle implement of the second vehicle; and a companion guidance controller in communication with the agricultural output characteristic input and the second vehicle characteristic input, and configured for communication with the second vehicle, the companion guidance controller includes:

one or more processors having:

a companion guidance line generator configured to generate a companion guidance line indicia based on a plurality of the discrete agricultural output characteristics inputs of the progressing discrete agricultural output characteristic input and the one or more second vehicle characteristics; and an association module configured to index the companion guidance line indicia relative to each of the plurality of discrete agricultural output characteristic;

wherein the companion guidance controller is configured to repeat companion guidance line generation and indexing of the companion guidance line indicia upon receipt of an updated discrete agricultural output characteristic.

14. The control system of claim 13, wherein the discrete agricultural output characteristic includes a position of a of a cut agricultural crop or a position of a first implement of the first vehicle generated contemporaneously to the first vehicle conducting the agricultural operation.

15. The control system of claim 14, wherein the companion guidance line generator is configured to generate the companion guidance line indicia that align a second implement of the second vehicle with the position of the cut agricultural crop.

16. The control system of claim 14, wherein the companion guidance line generator is configured to generate the companion guidance line indicia contemporaneously to the first vehicle conducting the agricultural operation.

17. The control system of claim 13, wherein the one or more second vehicle characteristics include one or more of an implement offset, implement characteristic, second vehicle sensor input, row section count, row section spacing, or specified leading offset between the first and second vehicles.

18. The control system of claim 13, wherein the companion guidance controller is configured to guide the second vehicle along a companion guidance line associated with the companion guidance line indicia and follow the first vehicle conducting the agricultural operation.

19. The control system of claim 13, wherein the companion guidance controller is configured to guide the second vehicle along a companion guidance line associated with the companion guidance line indicia and conduct a cooperative agricultural operation to the agricultural operation of the first vehicle.

20. The control system of claim 13, wherein the companion guidance controller is configured to guide the second vehicle along the companion guidance line indicia alongside the first vehicle conducting the agricultural operation.

21. The control system of claim 13, wherein the companion guidance line indicia include one or more of a plurality of guidance line points or guidance line segments.

22. A method for guiding at least one second vehicle of a vehicle team, the method comprising:

inputting a discrete progressing agricultural output characteristic input of a first vehicle in an ongoing manner, the discrete progressing agricultural output characteristic input corresponding to performing of an agricultural operation of the first vehicle;

wherein inputting the progressing agricultural output characteristic input includes receiving and indexing one or more of a position of portion of a first agricultural implement, a fiducial of the first agricultural implement, and the or a reference location of the first agricultural implement communicated from a position sensor coupled to the first implement;

inputting a second vehicle characteristic input based on one or more second vehicle characteristics of the at least one second vehicle;

wherein the second vehicle characteristic input accounts for one or more conditional characteristic of a second implement of the at least one second vehicle; and generating a companion guidance line of the at least one second vehicle, generating the companion guidance line includes:

recursively generating a companion guidance line indicia based on the input of the progressing agricultural output characteristic; and assembling a companion guidance line including appending the generated companion guidance line indicia with preceding companion guidance line indicia.

23. The method of claim 22, wherein the progressing agricultural output characteristic of the first vehicle includes an updating position of a cut agricultural crop or an updating position of a first implement of the first vehicle.

24. The method of claim 23, wherein recursively generating the companion guidance line indicia includes recursively generating companion guidance line indicia that align a second implement of the second vehicle with the updating position of the cut agricultural crop.

25. The method of claim 22, wherein the one or more second vehicle characteristics include one or more of static or dynamic second vehicle characteristics.

26. The method of claim 22, wherein recursively generating the companion guidance line indicia includes:

generating the companion guidance line indicia for one or more discrete progressing agricultural characteristics output of the first vehicle and the one or more second vehicle characteristics;

associating the companion guidance line indicia with the one or more discrete progressing agricultural characteristics output; and repeating generation and association of the companion guidance line indicia with updated discrete progressing agricultural characteristics output.

27. The method of claim 22 comprising guiding the second vehicle along the companion guidance line and following the first vehicle conducting the agricultural operation.

28. The method of claim 22 comprising guiding the second vehicle along the companion guidance line and conducting a cooperative agricultural operation to the agricultural operation of the first vehicle.

29. The method of claim 22 comprising guiding the second vehicle along the companion guidance line alongside the first vehicle conducting the agricultural operation.

30. The method of claim 22, wherein inputting the progressing agricultural output characteristic of the first vehicle includes inputting the progressing agricultural output characteristic as it is indexed by the first vehicle.

31. The method of claim 30, wherein recursively generating the companion guidance line indicia includes recursively generating the companion guidance line indicia as the input progressing agricultural output characteristic is indexed by the first vehicle.

32. The control system configured for guiding at least the second vehicle of the vehicle team of claim 1, wherein the position sensor is configured to provide indexed locations of the first implement and an offset is accounted for to virtually locate the indexed position of the first implement or the output of the first implement.

* * * * *